(12) United States Patent
Ma et al.

(10) Patent No.: US 8,897,234 B2
(45) Date of Patent: Nov. 25, 2014

(54) METHOD AND APPARATUS FOR CONTROLLING CARRIER FREQUENCY IN MULTI-CARRIER/CELL SYSTEM

(75) Inventors: Jie Ma, Shenzhen (CN); Yi Zhang, Shenzhen (CN); Jinlin Zhang, Shenzhen (CN); Jun Chen, Shenzhen (CN); Xiaofei Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 396 days.

(21) Appl. No.: 12/890,246

(22) Filed: Sep. 24, 2010

(65) Prior Publication Data

US 2011/0026422 A1 Feb. 3, 2011

Related U.S. Application Data

(63) Continuation of application No. PCT/CN2009/070969, filed on Mar. 24, 2009.

(30) Foreign Application Priority Data

Mar. 25, 2008 (CN) .......................... 2008 1 0087694
Sep. 26, 2008 (CN) .......................... 2008 1 0161299
Nov. 25, 2008 (CN) .......................... 2008 1 0180859

(51) Int. Cl.
  *H04W 72/04* (2009.01)
  *H04W 72/08* (2009.01)
  *H04L 12/26* (2006.01)
  *H04L 5/00* (2006.01)

(52) U.S. Cl.
  CPC .......... *H04W 72/0453* (2013.01); *H04L 12/26* (2013.01); *H04W 72/08* (2013.01); *H04W 72/0486* (2013.01); *H04L 5/0098* (2013.01)
  USPC .............................. 370/329; 370/252; 455/450

(58) Field of Classification Search
  CPC ................... H04W 72/0453; H04W 72/0486; H04W 72/08; H04W 72/042; H04L 5/0098; H04L 5/003; H04L 5/0058
  USPC ......... 370/216, 252, 329, 335, 342, 343, 345, 370/225, 333; 455/133, 418, 436, 439, 442, 455/509, 67.11, 424, 452.2, 522, 450; 714/748
  See application file for complete search history.

(56) References Cited

U.S. PATENT DOCUMENTS

2004/0146023 A1* 7/2004 Pietraski et al. .............. 370/333
2005/0219999 A1 10/2005 Kim et al.

(Continued)

FOREIGN PATENT DOCUMENTS

CN 1735258 A 2/2006
CN 1741674 A 3/2006

(Continued)

OTHER PUBLICATIONS

First Office Action issued in corresponding Chinese Patent Application No. 200810180859.X, mailed May 12, 2010.

(Continued)

*Primary Examiner* — Wing F Chan
*Assistant Examiner* — Raji Krishnan
(74) *Attorney, Agent, or Firm* — Staas & Halsey LLP

(57) ABSTRACT

Methods and apparatus are provided for controlling activation or deactivation of a carrier frequency in a multi-carrier/cell system. Activation or deactivation of a subsidiary carrier frequency is determined according to a parameter associated with the subsidiary carrier frequency. When the subsidiary carrier frequency is to be activated or deactivated, a message, such as an HS-SCCH order, is transmitted to a terminal to instruct the terminal to activate or deactivate the subsidiary carrier frequency. In this manner, a certain carrier frequency can be flexibly activated or deactivated in accordance with real-time assessment of multi-carrier/cell conditions.

21 Claims, 16 Drawing Sheets

(56) References Cited

U.S. PATENT DOCUMENTS

| | | | |
|---|---|---|---|
| 2005/0233716 A1 | 10/2005 | Laroia et al. | |
| 2006/0013182 A1* | 1/2006 | Balasubramanian et al. | 370/343 |
| 2006/0274712 A1* | 12/2006 | Malladi et al. | 370/345 |
| 2006/0281414 A1* | 12/2006 | Lindoff et al. | 455/67.11 |
| 2007/0054681 A1 | 3/2007 | Suh et al. | |
| 2007/0297325 A1* | 12/2007 | Larsson | 370/216 |
| 2008/0059859 A1* | 3/2008 | Marinier et al. | 714/748 |
| 2008/0101312 A1* | 5/2008 | Suzuki et al. | 370/342 |
| 2009/0017854 A1 | 1/2009 | Arimitsu | |
| 2009/0028103 A1 | 1/2009 | Wang et al. | |
| 2009/0213829 A1* | 8/2009 | Malkamaki et al. | 370/342 |
| 2009/0257387 A1* | 10/2009 | Gholmieh et al. | 370/329 |
| 2009/0296643 A1* | 12/2009 | Cave et al. | 370/329 |
| 2009/0316575 A1* | 12/2009 | Gholmieh et al. | 370/225 |
| 2011/0103326 A1* | 5/2011 | Kim et al. | 370/329 |
| 2011/0128925 A1* | 6/2011 | Lindoff et al. | 370/329 |
| 2012/0287869 A1* | 11/2012 | Xi et al. | 370/329 |

FOREIGN PATENT DOCUMENTS

| | | |
|---|---|---|
| CN | 1893341 A | 1/2007 |
| CN | 1910886 A | 2/2007 |
| CN | 1998170 A | 7/2007 |
| CN | 101026429 A | 8/2007 |
| CN | 101072173 A | 11/2007 |
| CN | 101156472 A | 4/2008 |
| CN | 101242398 A | 8/2008 |
| EP | 1475979 A1 | 11/2004 |
| WO | WO 2009/117944 A1 | 10/2009 |

OTHER PUBLICATIONS

Written Opinion of the International Searching Authority issues in corresponding PCT Patent Application No. PCT/CN2009/070969, mailed Jul. 9, 2009.

Rejection Decision on corresponding Chinese Application No. 200810180859.X, dated Aug. 31, 2012, and an English translation thereof, total 15 pages.

Office Action issued in corresponding Chinese Patent Application No. 200810180859.X, mailed Nov. 30, 2011.

Chinese Office Action dated Mar. 4, 2014 in related Chinese Patent Application No. 2012101644350 (4 pages).

Chinese Search Report dated Feb. 23, 2014 in related Chinese Patent Application No. 2012101644350 (2 pages).

* cited by examiner

| C/T | Carrier frequency control item | Signal quality item | State acknowledgement item | Carrier frequency activation | Signal quality content | State acknowledgement content |

Fig. 4

| Whether agree to the carrier disabling request | Whether agree to the carrier activating request | Time of carrier activation and deactivation |
|---|---|---|

Fig. 5

METHOD AND APPARATUS FOR CONTROLLING CARRIER FREQUENCY IN MULTI-CARRIER/CELL SYSTEM

CROSS-REFERENCE TO RELATED APPLICATIONS

This application is a continuation of International Application No. PCT/CN2009/070969, filed on Mar. 24, 2009, which claims priority to Chinese Patent Application No. 200810087694.1, filed on Mar. 25, 2008, Chinese Patent Application No. 200810161299.3, filed on Sep. 26, 2008, and Chinese Patent Application No. 200810180859.X, filed on Nov. 25, 2008, all of which are hereby incorporated by reference in their entireties.

FIELD OF THE DISCLOSURE

The present disclosure relates to the field of communication technology, and more particularly to a method and an apparatus for controlling a carrier frequency in a multi-carrier/cell system.

BACKGROUND

Existing High-speed Packet Access (HSPA) systems are borne on a signal frequency point. In order to improve a data transmission rate of the HSPA system and reduce the delay, so as to improve the user experience, a solution of binding a plurality of frequency points to bear HSPA data is proposed. In this solution, two (or more) carrier frequencies of 5 MHz in a downlink (DL) direction are bounded together for transmitting the HSPA data. The most important is to bind the two carrier frequencies, in which the two carrier frequencies may be considered as frequency points respectively used by two cells covering the same area. Furthermore, the number of the carrier frequencies used by uplink (UL) and DL may be the same or different, but generally, the number of the DL carrier frequencies is greater than that of the UL carrier frequencies. In a system for binding a plurality of carrier frequencies for transmitting HSPA data, two carrier frequencies are used for DL, and two carrier frequencies are used for UL, which is so-called a 2*2 mode; or two carrier frequencies are used for DL, and one carrier frequency is used for UL, which is so-called a 2*1 mode. In the two modes, two carrier frequencies are used for DL.

One multi-carrier/cell may support a plurality of carrier frequencies, and the cells corresponding to the carrier frequencies generally have a certain correlation in geographical position. The multi-carrier/cell has two definitions: one refers to a special cell different from the original single carrier/cell, having its own cell ID, supporting a plurality of carrier frequencies; and the other refers to a cell set, in which each cell is an independent individual like the original single carrier/cell, and the cell IDs of the cells may be the same or different.

With the concept of primary carrier frequency introduced, if only one carrier frequency is used by the UL or DL simultaneously, the frequency point serves as a primary carrier frequency. If UL and DL service is borne on a Dedicated Channel (DCH), the frequency point where the DCH is located serves as the primary carrier frequency. If two carrier frequencies are used by the UL and the DL simultaneously, and no service is borne on the DCH, a Radio Network Controller (RNC) determines to change the primary carrier frequency according to the 2a event (preferably, carrier frequency change) reported by a User Equipment (UE). After the primary carrier frequency is changed each time, the RNC delivers a new measurement control message to notify the UE of the frequency points for co-channel switching measurement.

The UE determines to trigger a 1x/2x event only according to the primary carrier frequency. But when the measurement report is reported, only information of the two frequency points needs to be carried. When the network side determines whether to add the cell into an activity set (especially when a 1d event is triggered), the signal quality of the two carrier frequencies should be taken into consideration.

In the foregoing description, the measurement event of the carrier frequency/cell of the non-primary carrier frequency uses a different frequency event, such as, 2x event, and the measurement event of the carrier frequency/cell of the carrier frequency uses a 1x event. For example, the primary carrier frequency is corresponding to a carrier frequency A, and cells 1 and 2; and the non-primary carrier frequency is corresponding to a carrier frequency B, and cells 3 and 4. The measurement event of the cells 3 and 4 uses events 2a, 2b, 2c, 2d, and the measurement event of the cells 1 and 2 uses events 1a, 1b, 1c, 1d.

In the prior art, a multi-carrier/cell can be used for data transmission, as the environment where the user terminal is located varies at any time, and accordingly, the carrier frequency quality also varies with the environment. However, no method for adjusting the carrier frequency according to the carrier frequency quality is provided, and thus the optimization of the network quality is influenced.

SUMMARY

In an embodiment, the present disclosure provides a method for controlling a carrier frequency in a multi-carrier/cell system, which includes the following steps. Channel Quality Indicator (CQI) information of the carrier frequency reported by a terminal is received. Determine whether to deactivate or activate the carrier frequency according to the CQI information. The terminal is instructed to deactivate or activate the carrier frequency according to a result of the determining.

In another aspect, in an embodiment, the present disclosure provides a network device, which includes an information receiving module, a carrier frequency determining module, and an instruction sending module. The information receiving module is adapted to receive CQI information sent by a terminal. The carrier frequency determining module is adapted to compare the CQI information received by the information receiving module with a deactivation threshold or an activation threshold received by the threshold receiving module, so as to determine whether to deactivate or activate the carrier frequency. The instruction sending module is adapted to send a result of the carrier frequency determining module to the terminal.

In another aspect, in an embodiment, the present disclosure provides a terminal, which includes a condition receiving module, an information reporting module, and a carrier frequency operation module. The condition receiving module is adapted to receive carrier frequency reporting conditions. The information reporting module is adapted to report CQI information of a carrier frequency satisfying the carrier frequency reporting conditions received by the condition receiving module, so as to determine whether to deactivate or activate the carrier frequency. The carrier frequency operation module is adapted to deactivate or activate the carrier frequency according to a result of the deactivation or activation determination.

According to an embodiment, the present disclosure adopts the method of carrier frequency quality information reporting and threshold determination, such that when two carrier frequencies are used in DL, and a base station Node B serves as a control center, a certain carrier frequency is flexibly activated or deactivated.

In another aspect, in an embodiment, the present disclosure provides a method for setting up a multi-carrier/cell connection between a terminal and a network, which includes the following steps. Information indicating a multi-carrier/cell capability of the terminal sent by the terminal is received, and a multi-carrier/cell connection between a terminal and a network is set up.

In another aspect, in an embodiment, the present disclosure provides a method for controlling a carrier frequency in a multi-carrier/cell system, which includes the following steps. Determine whether to deactivate or activate the carrier frequency according to a measurement performance of the carrier frequency; and the terminal is instructed to deactivate or activate the carrier frequency according to a result of the determining. Alternatively, determine whether to the carrier frequency a subsidiary carrier frequency according to a buffering performance of a multi-carrier/cell; and the terminal is instructed to deactivate or activate the subsidiary carrier frequency according to a result of the determining.

In another aspect, in an embodiment, the present disclosure provides a method for controlling a carrier frequency in a multi-carrier/cell system, which includes the following steps. It is determined whether to deactivate or activate the carrier frequency according to a measurement performance of the carrier frequency or CQI information of the carrier frequency reported by a terminal; and the terminal is instructed to deactivate or activate the carrier frequency according to a result of the determining. Alternatively, determine whether to deactivate or activate a subsidiary carrier frequency according to a buffering performance of a multi-carrier/cell; and the terminal is instructed to deactivate or activate the subsidiary carrier frequency according to a result of the determining.

According to an embodiment of the present disclosure, a certain carrier frequency is flexibly activated and deactivated through controlling of Node B.

In another aspect, in an embodiment, the present disclosure provides a method for controlling and activating a carrier frequency in a multi-carrier/cell system, which includes the following steps. A terminal determines whether to activate a UL carrier frequency/cell according to a determination criteria notified by an RNC and a traffic volume and channel quality of the UL carrier frequency. A network determines whether to activate or deactivate the UL carrier/cell according to a result of the determining of the terminal in combination with a load of the network or a DL signal quality feedback of the network.

According to an embodiment of the present disclosure, a certain carrier frequency is flexibly activated and deactivated through controlling of RNC.

In another aspect, in an embodiment, the present disclosure provides a network device, which includes a determination module and an instruction module. The determination module is adapted to determine whether to deactivate or activate a carrier frequency according to a measurement performance of the carrier frequency, or is adapted to determine whether to deactivate or activate a subsidiary carrier frequency according to a buffering performance of a multi-carrier/cell. The instruction module is adapted to instruct the terminal to deactivate or activate the carrier frequency according to a determination result of the determination module when the determination module makes the determination according to the measurement performance of the carrier frequency, and instruct the terminal to deactivate or activate the subsidiary carrier frequency according to a determination result of the determination module when the determination module makes the determination according to the buffering performance of the multi-carrier/cell.

In another aspect, in an embodiment, the present disclosure provides a method for activating/deactivating a carrier frequency in a multi-carrier/cell system, which includes the following step. A terminal is instructed to deactivate or activate a carrier frequency according to a result of an activation/deactivation determination of the carrier frequency.

According to an embodiment of the present disclosure, a certain carrier frequency is flexibly activated and deactivated.

BRIEF DESCRIPTION OF THE DRAWINGS

The accompanying drawings for illustrating the embodiments of the present disclosure or the prior art are outlined below. Apparently, the accompanying drawings are for the exemplary purpose only, and person having ordinary skill in the art can derive other drawings from such accompanying drawings without any creative effort.

FIG. 4 is a schematic view of a format of Media Access Control (MAC) controlling Protocol Data Unit (PDU) according to embodiment 3 of the present disclosure;

FIG. 5 is a schematic view of a content of a state acknowledgement item according to embodiment 3 of the present disclosure;

DETAILED DESCRIPTION OF THE EMBODIMENTS

In an embodiment, the present disclosure provides a method and an apparatus for controlling a carrier frequency in a multi-carrier/cell system, capable of performing a corresponding deactivation or activation operation on the carrier frequency in the multi-carrier/cell system through carrier frequency quality reporting and threshold determination, so as to optimize network quality, and improve user experience.

Hereinafter, the specific implementation of the present disclosure is further described in detail with reference to the accompanying drawings and embodiments.

Figure 1A:
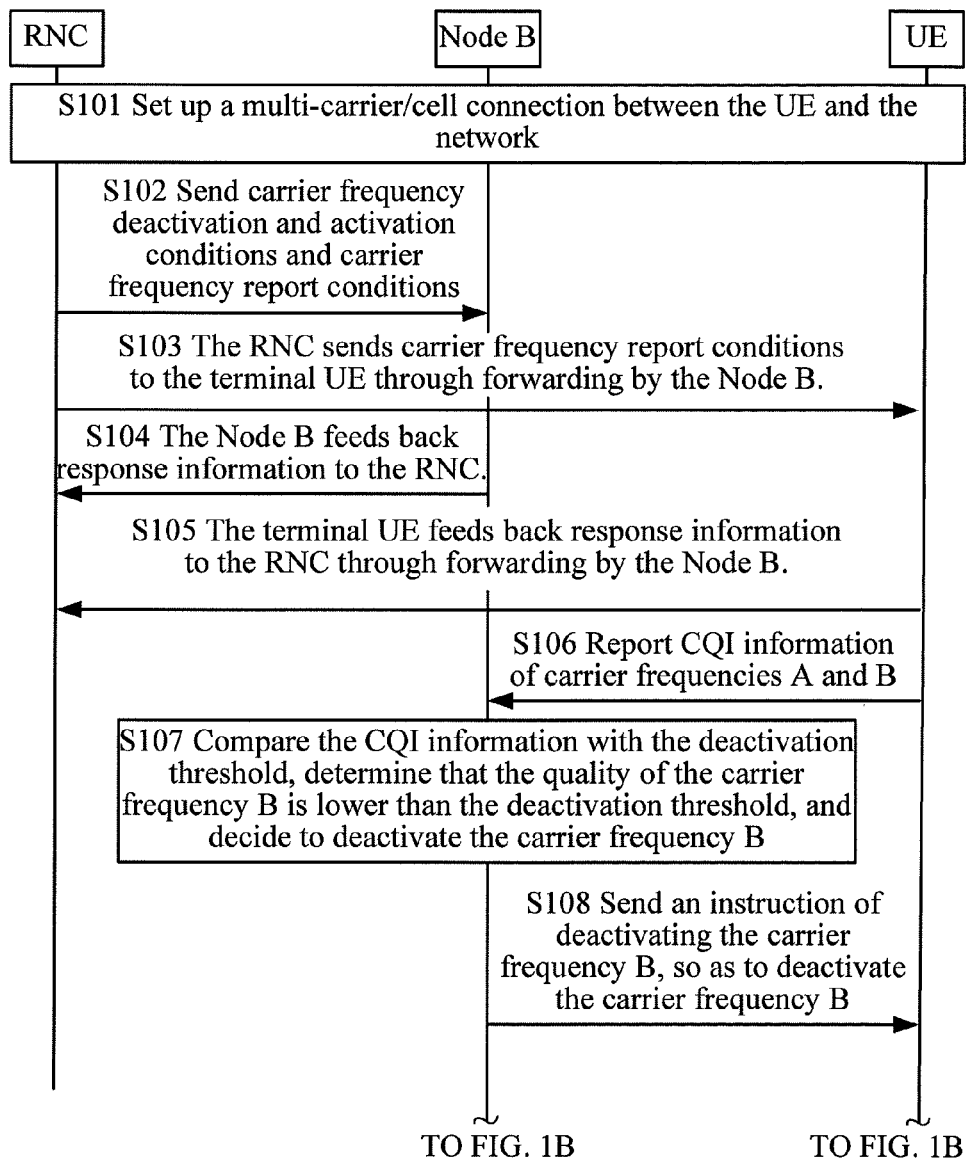
FIG. 1 is a schematic flow chart of a method for controlling a carrier frequency in a multi-carrier/cell system according to embodiment 1 of the present disclosure.
Figure 1B:
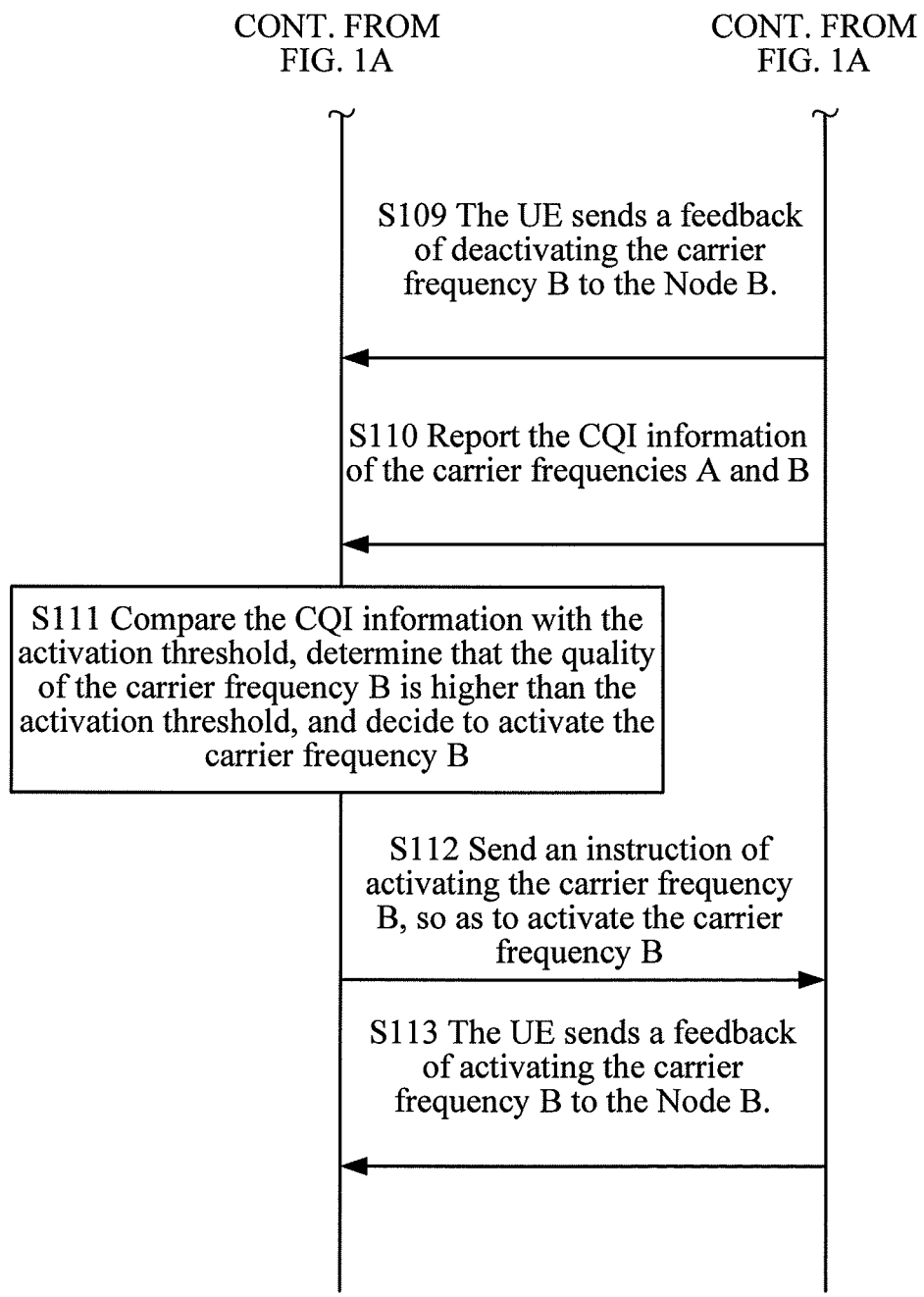

FIG. 1 is a schematic flow chart of a method for controlling a carrier frequency in a multi-carrier/cell system according to embodiment 1 of the present is closure. As shown in FIG. 1, the method includes the following steps.

In Step S101, a multi-carrier/cell connection is set up between a terminal UE and a network.

Through two DL carrier frequencies and one or two UL carrier frequencies, the multi-carrier/cell connection is set up.

When the multi-carrier/cell connection is set up through two DL carrier frequencies and one UL carrier frequency, a Fractional Dedicated Physical Channel (F-DPCH) is set up on the DL carrier frequencies corresponding to the UL carrier frequency for performing power control of a UL physical channel, and data is sent through a High-Speed Down Share Channel (HS-DSCH); and on the rest DL carrier frequencies, data is sent through the HS-DSCH.

For detailed description of the step and added fields to be written into each signaling, see a subsequent embodiment 2 of the present disclosure.

In Step S102, an RNC sends carrier frequency deactivation and activation conditions and carrier frequency reporting conditions to a Node B.

Specifically, the conditions are a deactivation threshold, an activation threshold, and carrier frequency reporting conditions.

In Step S103, the RNC sends the carrier frequency reporting conditions to the terminal UE through forwarding by the Node B.

The terminal UE receives the carrier frequency reporting conditions sent by the RNC through the forwarding by the Node B, in which the carrier frequency reporting conditions specify a measurement semaphore, a measurement start time, a measurement end time, measurement conditions, and a report time of measurement result.

In Step S104, the Node B feeds back response information to the RNC.

It should be noted that the sequence of Steps S103 and S104 can be exchanged, and the changes in the sequence will not influence the protection scope of the present disclosure.

In Step S105, the terminal UE feeds back response information to the RNC through the forwarding by the Node B.

In Step S106, the terminal UE reports CQI information of carrier frequencies A and B satisfying the carrier frequency reporting conditions to the Node B.

The report method includes: reporting the CQI information by carrying the CQI information by an MAC PDU; or reporting the CQI information by carrying the CQI information by a physical layer signaling.

In Step S107, the Node B compares the CQI information with the deactivation threshold, determines that the quality of the carrier frequency B is lower than the deactivation threshold, and determines to deactivate the carrier frequency B.

In Step S108, the Node B sends an instruction of deactivating the carrier frequency B to the terminal UE, so as to deactivate the carrier frequency B.

The method for sending the instructing includes: carrying a deactivation instruction by an MAC controlling PDU, or carrying a deactivation instruction by a physical layer signaling.

In Step S109, the terminal UE sends a feedback of deactivating the carrier frequency B to the Node B.

In Step S110, the terminal UE reports the CQI information of the carrier frequencies A and B satisfying the carrier frequency reporting conditions to the Node B.

The report method includes: reporting the CQI information by carrying the CQI information by the MAC controlling PDU; or reporting the CQI information by carrying the CQI information by the physical layer signaling for reporting.

In the step, the carrier frequency B has been deactivated, but is still a carrier frequency satisfying the carrier frequency reporting conditions, so the CQI information of the carrier frequency B is still reported.

In Step S111, the Node B compares the CQI information with the activation threshold, determines that the quality of the carrier frequency B is higher than the activation threshold, and determines to activate the carrier frequency B.

In Step S112, the Node B sends an instruction of activating the carrier frequency B to the terminal UE, so as to activate the carrier frequency B.

The carrier frequency B is activated through the activation instruction carried through the MAC controlling PDU.

Alternatively, the carrier frequency B is activated through the activation instruction carried through the physical layer signaling.

In Step S113, the terminal UE sends a feedback of activating the carrier frequency B to the Node B.

It should be further noted that when only the deactivation threshold and the carrier frequency reporting conditions are sent in Step S102 of this embodiment, Steps S101 to S109 form a carrier frequency deactivation process; and when only the activation threshold and the carrier frequency reporting conditions are sent in Step S102, Steps S101 to S105 and S110 to S113 form a carrier frequency activation process.

Embodiment 2

Figure 2:
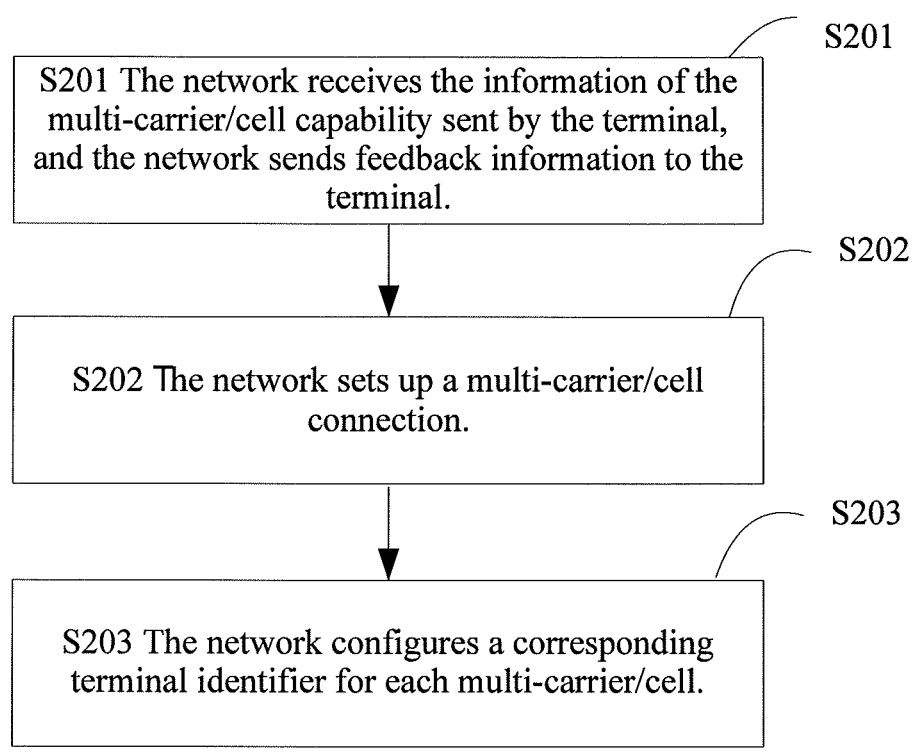
FIG. 2 is a schematic flow chart of a method for setting up a multi-carrier/cell connection between a terminal and a network according to embodiment 2 of the present disclosure.

In order to illustrate the technical solutions of the present disclosure in detail, as shown in FIG. 2, a process of setting up a multi-carrier/cell connection between a terminal UE and a network is described with the embodiment 2 of the present disclosure.

A cell with a multi-carrier/cell capability broadcasts the multi-carrier/cell capability or a collaboration capability between the multi-carrier/cell, for example, a Node B has three frequency points arranged therein, each frequency point has two cells, and cells of different carrier frequencies among the cells can collaborate with one another. The terminal UE with multi-carrier/cell capability reports the capability in a Radio Resource Control (RRC) connection setup request (in this embodiment, taking an RRC connection setup request message as an example). A network UTRAN receives the RRC connection setup request message of the terminal UE and knows the multi-carrier/cell capability of the terminal UE and an approximate service type requested by the terminal UE, and then assigns the terminal UE to use a multi-carrier/cell receiving capability and/or a multi-carrier/cell sending capability in an RRC connection setup (representing that the RRC connection setup is completed) message.

When the terminal UE is in a connection state, and the terminal UE or the network initiates a new service, the network knows that both the terminal UE and the cell have the multi-carrier/cell capability, so the network notifies the terminal UE of using the multi-carrier/cell receiving capability and/or the multi-carrier/cell sending capability through various reconfiguration messages. The UTRAN configures a corresponding UEID for use of each carrier/cell. For example, the terminal UE can use two DL carrier/cells and one UL carrier/cell, and accordingly, the terminal UE should have two HS-DSCH Radio Network Identifiers (H-RNTIs), and one Primary Enhanced Radio Network Identifier (E-RNTI). The terminal UE uses two DLs and two ULs, and accordingly, the terminal UE should have two H-RNTIs and two Primary E-RNTIs.

The network sets up the multi-carrier/cell connection with the terminal through a plurality of DL carrier frequencies and a plurality of UL carrier frequencies. The number of the DL carrier frequencies is greater than or equal to that of the UL carrier frequencies, for example, when the multi-carrier/cell connection is set up through M DL carrier frequencies and N UL carrier frequencies, and M is greater than N, the F-DPCH is set up on the N DL carrier frequencies corresponding to the UL carrier frequencies for performing power control of the UL physical channel, data is sent though an HS-DSCH, and on the rest M-N DL carrier frequencies, data is sent through the HS-DSCH. For example, if only one of the UL carrier/cells of the terminal UE is used, data is sent through the HS-DSCH on the two DL frequency points. Moreover, the F-DPCH may be only set up on the corresponding DL frequency point for performing power control of the UL physical channel, and as the other DL frequency point has no corresponding UL physical channel, only HS-DSCH is set up without setting up the DL physical channel for performing power control on the UL.

A process of setting up the multi-carrier/cell connection between the terminal UE and the network includes the following steps.

In Step s201, the network receives the information of the multi-carrier/cell capability sent by the terminal.

Specifically, after receiving the capability information of the terminal, the network sends feedback information to the terminal.

In Step s202, the network sets up the multi-carrier/cell connection.

Specifically, after the network sets up the multi-carrier/cell connection, the process further includes Step s203.

In Step s203, the network configures a corresponding terminal identifier for each multi-carrier/cell.

According to an embodiment of the present disclosure, a certain carrier frequency is flexibly activated and deactivated.

Tables 1-5 list information units indicating the terminal UE to use the multi-carrier/cell receiving capability and/or the multi-carrier/cell sending capability in the message. The following tables are merely a specific demonstration, and modifications on the tables based on the technical spirit will not affect the protection scope of the present disclosure.

TABLE 1

| RRC connection setup | |
|---|---|
| Information Element/Group name | Need |
| Message Type | MP |
| UE Information Elements | |
| Initial UE identity | MP |

TABLE 1-continued

| RRC connection setup | |
|---|---|
| Information Element/Group name | Need |
| RRC transaction identifier | MP |
| Activation time | MD |
| New U-RNTI | MP |
| New C-RNTI | OP |
| New H-RNTI | OP |
| CHOICE mode | MP |
| >FDD | |
| >>New Primary E-RNT | OP |
| >>New Secondary E-RNTI | OP |
| >TDD | |
| >>New E-RNTI | |
| RRC State Indicator | MP |
| UTRAN DRX cycle length coefficient | MP |
| Capability update requirement | MD |
| CHOICE specification mode | MP |
| >Complete specification | |
| RB Information Elements | |
| >>Signalling RB information to setup list | MP |
| >>>Signalling RB information to setup | MP |
| TrCH Information Elements | |
| Uplink transport channels list (newly added cell information) | (1 to max Frequency number) |
| >Frequency id (newly added cell information) | Indication frequency point information |
| >>UL Transport channel information common for all transport channels | OP |
| >>Added or Reconfigured TrCH information list | MP |
|  | OP |
| >>>Added or Reconfigured UL TrCH information | MP |
| Downlink transport channels list | (1 to max Frequency number) |
| >Frequency id (newly added cell information) | Indication frequency point information |
| >>DL Transport channel information common for all transport channels | OP |
| >>Added or Reconfigured TrCH information list | MP |
|  | OP |
| >>>Added or Reconfigured DL TrCH information | MP |
| >Preconfiguration | |
| >>CHOICE Preconfiguration mode | MP |
| >>>Predefined configuration identity | MP |
| >>>Default configuration | |
| >>>>Default configuration mode | MP |
| >>>>Default configuration identity | MP |
| PhyCH information elements | |
| Frequency info | OP |
| Multi-frequency Info | OP |
| DTX-DRX timing information | OP |
| DTX-DRX Information | OP |
| HS-SCCH less Information | OP |
| Uplink radio resources list (newly added cell information) | (1 to max Frequency number) |
| >Frequency id (newly added cell information) | Indication frequency point information |
| Maximum allowed UL TX power | MD |
| Uplink DPCH info | OP |
| E-DCH Info | OP |
| Downlink radio resources list (newly added cell information) | (1 to max Frequency number) |
| >Frequency id (newly added cell information) | Indication frequency point information |
| Downlink HS-PDSCH Information | OP (Table 2) |
| Downlink information common for all radio links | OP ( ) |
| Downlink information per radio link list | OP |
| >Downlink information for each radio link | MP (Table 5) |

TABLE 2

Downlink HS-PDSCH Information

| Information Element/Group name | Need | Multi | Type and reference | Semantics description | Version |
|---|---|---|---|---|---|
| HS-SCCH Info | OP | | HS-SCCH Info 10.3.6.36a | (for modificatins, see Table 3) | REL-5 |
| Measurement Feedback Info | OP | | Measurement Feedback Info 10.3.6.40a | (for modificatins, see Table 4) | REL-5 |
| CHOICE mode >FDD | MP | | | | REL-5 |
| >>Downlink 64QAM configured | OP | | Enumerated (TRUE) | Absence of this IE means that the HS-SCCH does not use the 64QAM format. | REL-7 |

TABLE 3

HS-SCCH INFO

| Information Element/Group name | Need | Multi | Type and reference | Semantics description | Version |
|---|---|---|---|---|---|
| CHOICE mode >FDD | MP | | | | REL-5 |
| >>Frequency id (added cell information) | MP | 1 to <maxFrequencynumber> | | Indication frequency point information | REL-5 |
| >>>DL Scrambling Code | MD | | Secondary scrambling code 10.3.6.74 | DL Scrambling code to be applied for HS-DSCH and HS-SCCH. Default is same scrambling code as for the primary CPICH. | REL-5 |
| >>>HS-SCCH Channelisation Code Information | MP | 1 to <maxHSSCCHs> | | | REL-5 |
| >>>>HS-SCCH Channelisation Code | MP | | Integer (0 ... 127) | | REL-5 |

TABLE 4

Measurement Feedback Info

| Information Element/Group name | Need | Multi | Type and reference | Semantics description | Version |
|---|---|---|---|---|---|
| CHOICE mode >FDD | MP | | | | REL-5 |
| >>Frequency id (added cell information) | MP | 1 to <maxFrequencynumbers> | | Indication frequency point information | REL-5 |
| >>Measurement Power Offset | MP | | Real (−6 ... 13 by step of 0.5) | The measurement power offset, $\Gamma$, in dB, as described in [29]. | REL-5 |
| >>CQI Feedback cycle, k ( | MP | | Integer (0, 2, 4, 8, 10, 20, 40, 80, 160, 16, 32, 64) | In milliseconds. In milliseconds. | REL-5 REL-7 |
| >>CQI repetition factor | MP | | Integer (1 ... 4) | | REL-5 |

TABLE 4-continued

Measurement Feedback Info

| Information Element/Group name | Need | Multi | Type and reference | Semantics description | Version |
|---|---|---|---|---|---|
| >>☐CQI (power offset) | MP | | Integer (0 . . . 8) | Refer to quantization of the power offset in [28] | REL-5 |

TABLE 5

Downlink information for each radio link

| Information Element/Group name | Need | Multi | Type and reference | Semantics description | Version |
|---|---|---|---|---|---|
| CHOICE mode | MP | | | | |
| >FDD | | | | | |
| >Frequency id (added cell information) | MP | 1 to <maxFrequencynumbers> | | Indication frequency point information | |
| >>Primary CPICH info | MP | | Primary CPICH info 10.3.6.60 | | |
| >>Cell ID | OP | | Cell ID 10.3.2.2 | | REL-4 |
| >>Serving HS-DSCH radio link indicator | MP | | Boolean | The value TRUE indicates that this radio link is the serving HS-DSCH radio link | REL-5 |
| >>Serving E-DCH radio link indicator | MP | | Boolean | The value TRUE indicates that this radio link is the serving E-DCH radio link | REL-6 |
| >TDD | | | | | |
| >>Primary CCPCH info | MP | | Primary CCPCH info 10.3.6.57 | | |
| CHOICE DPCH info | OP | | | | REL-6 |
| >Downlink DPCH info for each RL | MP | | Downlink DPCH info for each RL 10.3.6.21 | | |
| >Downlink F-DPCH info for each RL | MP | | Downlink F-DPCH info for each RL 10.3.6.23ob | | REL-6 |
| E-AGCH Info (E-AGCH information) | OP | | E-AGCH Info 10.3.6.100 | | REL-6 |
| CHOICE mode | | | | | REL-7 |
| >FDD | | | | | REL-7 |
| >>CHOICE E-HICH Information | OP | | | | REL-6 |
| >>>E-HICH Information | MP | | E-HICH Info 10.3.6.101 | | REL-6 |
| >>>E-HICH release indicator | | | | (no data) | REL-6 |
| >>CHOICE E-RGCH Information | OP | | | | REL-6 |
| >>>E-RGCH | MP | | E-RGCH | | REL-6 |

TABLE 5-continued

Downlink information for each radio link

| Information Element/Group name | Need | Multi | Type and reference | Semantics description | Version |
|---|---|---|---|---|---|
| Information (E-RGCH information) | | | Info 10.3.6.102 | | |
| >>>E-RGCH release indicator | | | | (no data) | REL-6 |
| >TDD | | | | (no data) | REL-7 |
| >>E-HICH Information (E-HICH information) | OP | | E-HICH Info 10.3.6.101 | | REL-7 |

Embodiment 3

Figure 3:
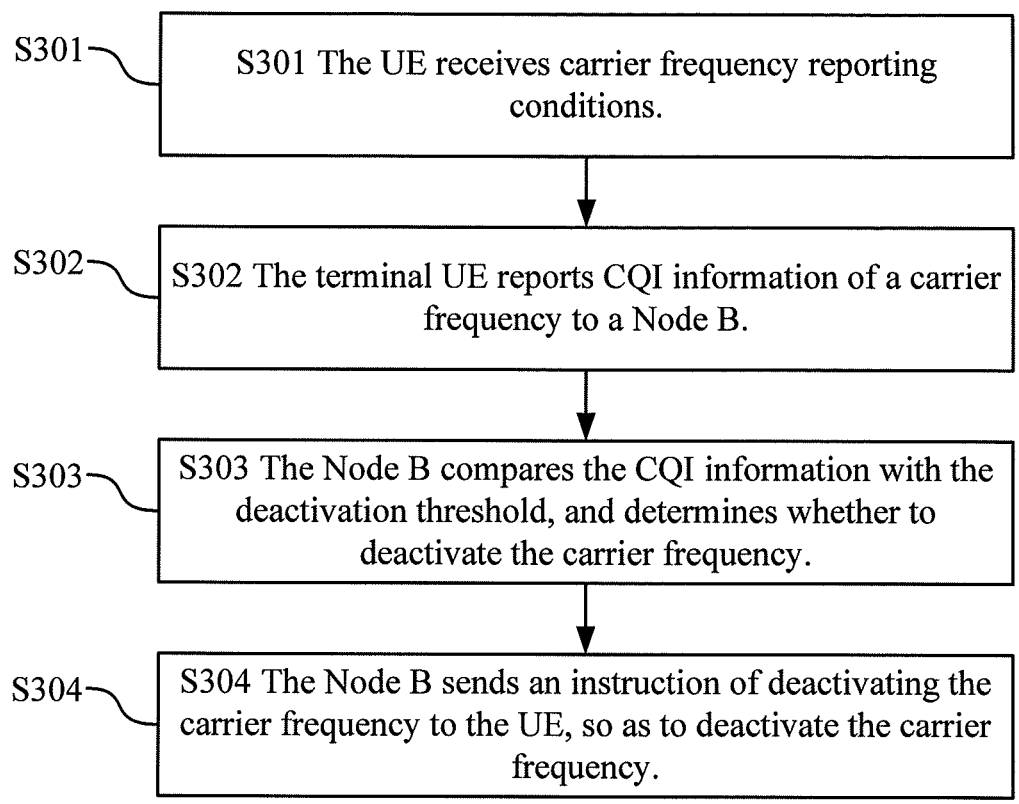
FIG. 3 is a schematic flow chart of deactivating a carrier frequency according to embodiment 3 of the present disclosure.

As shown in FIG. 3, a process of determining to deactivate a carrier frequency is described in detail with embodiment 3 of the present disclosure. The process includes the following steps.

In Step S301, a terminal UE receives carrier frequency reporting conditions.

This message specifies a measurement semaphore, a measurement start time, a measurement end time, measurement conditions, and a report time of measurement result.

In Step S302, the terminal UE reports CQI information of the carrier frequency to a Node B.

It should be specified in the step that the method for reporting measurement values of the terminal UE deactivating the carrier/cell to the Node B, measurements through which the Node B obtains quality and power of a radio link of a certain carrier/cell and other information. Currently, the terminal UE reports the CQI in a High-Speed Dedicated Physical Control Channel (HS-DPCCH), in which the value may serve as an input amount of the Node B for decision. A Node B receiver reports a received Block Error Rate (BLER) value to a Node B scheduler, so as to enable the Node B to make a decision.

In Step S303, the Node B compares the CQI information with the deactivation threshold, and determines whether to deactivate the carrier frequency.

In the step, the deactivation threshold is sent to the Node B by an RNC.

The deactivation occurs on the following conditions: a signal quality of the carrier/cell is lower than a threshold (Ec/N0); and/or a Received Signal Code Power (RSCP) of the carrier/cell is lower than a threshold; and/or a BLER of data transferred on the carrier/cell is higher than a threshold; and/or a data transmission power on the carrier/cell is higher than a threshold; and/or times of data retransmission on the carrier/cell is higher than a threshold; and/or synchronization loss of a certain link of the Node B and the terminal UE. The duration of the condition may be a duration that must be maintained for a certain length of time for making a decision, or may be a duration that a decision is made immediately, which depends on the purpose and requirements of use of the UTRAN on each carrier/cell. The condition is notified to the Node B by the RNC, and the terminal UE need not know the condition. The method of notifying the Node B by the RNC includes adding a dedicated signaling into an Iub interface or carrying the condition in a radio link setup reconfiguration message.

In S304, the Node B sends an instruction of deactivating the carrier frequency to the UE, so as to deactivate the carrier frequency. Hereinafter, the process of deactivating the carrier frequency is further described, which includes the following steps.

In Step 1, the Node B determines to deactivate a certain carrier frequency.

In Step 2, the Node B sends the instruction of deactivating the carrier frequency to the terminal UE, so as to deactivate the carrier frequency.

After making the determination, the Node B notifies the terminal UE of deactivating the certain carrier/cell, which includes the following two methods.

In method A, as shown in FIGS. 4 and 5, a field of the MAC controlling PDU is adapted to notify the terminal UE. The field contained in the MAC controlling PDU includes a C/T PDU indicator bit, a carrier frequency control item, a signal quality item, a state acknowledgement item, a carrier frequency activation bit, a signal quality content bit, and a state acknowledgement content bit.

The C/T PDU indicator bit is adapted to indicate that the PDU is a controlling PDU or a data PDU.

The carrier frequency control item is adapted to indicate whether the PDU contains the carrier frequency control item.

The signal quality item is adapted to indicate whether the PDU contains a signal quality CQI report item.

The state acknowledgement item is adapted to indicate whether the PDU contains the state acknowledgement item, for example, whether an acknowledgement to the control instruction received by the opposite end exists.

The carrier frequency activation bit is adapted to instruct to activate or deactivate the carrier/cell, in which each carrier frequency occupies 1 bit; when the bit is set to be 1, it indicates to activate the carrier/cell, and when the bit is set to be 0, it indicates to deactivate the carrier/cell.

The signal quality content bit contains the signal quality of all the carrier frequencies.

The state response content bit makes the acknowledgement to activation/deactivation, in which each carrier frequency occupies 1 bit. When activation/deactivation is performed on the carrier frequency, an acknowledge character (ACK) is returned, and when no activation/deactivation is performed on the carrier frequency, a non acknowledge character (NACK) is returned.

One item for the controlling PDU is defined as whether to use a certain DL carrier/cell, and another item is defined as whether to use a certain UL carrier/cell. The two items may occupy a bit respectively, and when the bit is set to be 0, it indicates to use the carrier/cell. When the bit is set to be 1, it indicates not to use the carrier/cell. The number of bits of whether to deactivate the carrier/cell is controlled to be equal to the number of the UL plus DL carrier/cells, or to be equal to the number of carrier/cells used at most. The sequence of the bits is the same as the list sequence of the carrier/cells when the terminal UE receives the connection setup or reconfiguration message.

After determining to disable a carrier/cell, the Node B should send the MAC controlling PDU to the terminal UE, and the DL carrier/cell not being disabled is used preferably to send the MAC PDU, so as to ensure that the control message is received reliably. After receiving the disable notification, the terminal UE should respond to the Node B and indicate that it has received the notification information. The acknowledgement message may be in the form of ACK of Hybrid Automatic Repeat reQuest (HARQ) or an acknowledgement of the MAC layer controlling PDU. FIG. 5 is a schematic view of a content of a state acknowledgement item. The response should be sent by using preferably the UL carrier/cell not being disabled.

Figure 6:
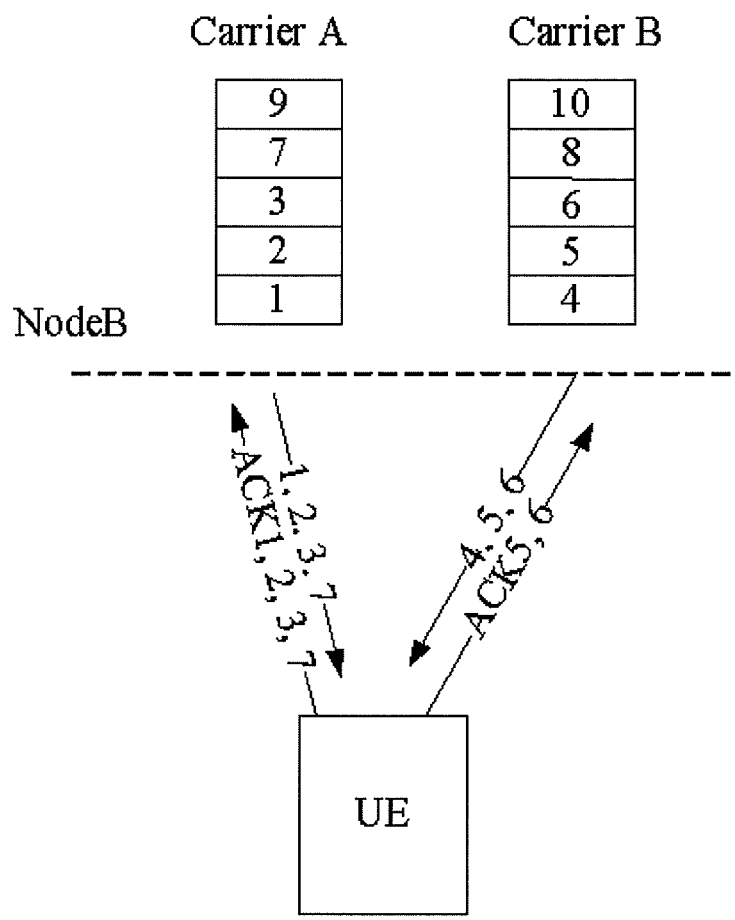
FIG. 6 is a schematic view of a data sending situation at a moment of deactivating a carrier frequency according to embodiment 3 of the present disclosure.
Figure 7:
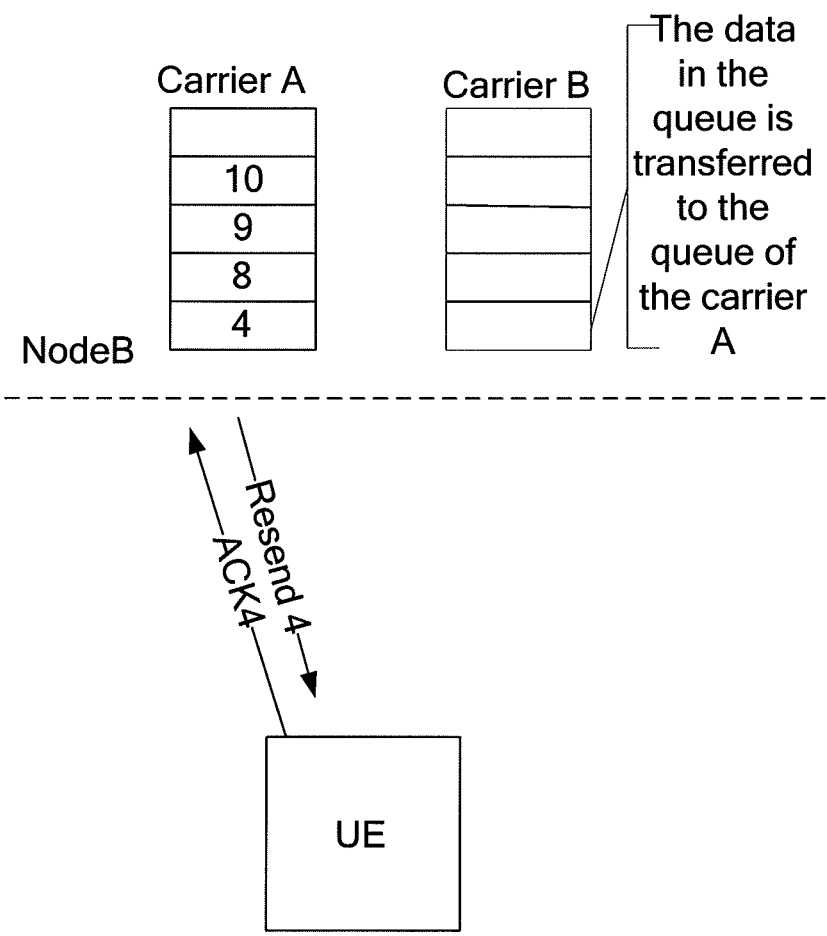
FIG. 7 is a schematic view of a data transferring procedure according to embodiment 3 of the present disclosure.

Hereinafter, the method and procedure of deactivating a carrier frequency is further described with reference to FIGS. 6 and 7.

After the Node B determines to deactivate a carrier/cell, for example, to disable a carrier/cell B, and if the carrier/cell B is a DL carrier/cell, the Node B transfers the data that is ready to be sent by the carrier/cell B back to a carrier/cell A for sending, and as for packets that have been sent but having no HARQ acknowledgement response of the terminal UE received, the Node B waits for the HARQ acknowledgement of the terminal UE. If no acknowledgement of the terminal UE is received when the acknowledgement time expires or the acknowledgement is NACK, the data will not be resent on the carrier/cell B, but is transferred to the carrier/cell A for resending. The resent data may be resent preferably on the carrier/cell A. The packets transferred from the carrier/cell B to the carrier/cell A for resending may be sequenced and sent according to a sequence number of the RLC layer of the data, but not directly disposed at the tail of the data sequence in the carrier/cell A. FIG. 5 shows the data sending states of two carrier/cells when the carrier/cell B is disabled, and FIG. 7 is a schematic view of transferring the data in a corresponding queue of the carrier/cell B into the carrier/cell A for sending after the carrier/cell B is disabled. If the two carrier/cells share an MAC--hs/ehs queue, only the data to be resent is processed, and transfer and insertion procedures of the queue are omitted.

When the Node B determines to deactivate a UL carrier/cell, for example, to disable a carrier/cell C, the Node B should provide an acknowledgement of the terminal UE through an E-DCH HARQ Acknowledgement Indicator Channel (E-HICH) for the packets that has been received but has not been acknowledged, and the Node B should complete receiving the data of the terminal UE scheduled before being notified for disabling, and stop scheduling the carrier/cell C.

After receiving the MAC controlling PDU, the terminal UE finds out that the MAC controlling PDU instructs the terminal UE to disable a certain carrier/cell through resolution, and the terminal UE will perform the following processes on the data on the carrier/cell.

1) When the disabled carrier/cell is a DL carrier/cell, the terminal UE performs a Cyclical Redundancy Check (CRC) on the packets (not the MAC PDU) received by the disabled carrier/cell, and if a check result is correct, the terminal UE returns ACK to the Node B, and if the check result is error, the terminal UE returns NACK. If no packet is to be received at this time, the terminal UE directly stops receiving the carrier/cell and deletes a timer and a counter related to the carrier/cell.

2) When the disabled carrier/cell is a UL carrier/cell, the terminal UE firstly uses up the resource scheduled on the carrier/cell, then stops sending the data on the carrier/cell, and transfers the data that is ready to be sent on the disabled carrier/cell originally to another carrier/cell for sending. For the data that needs to be resent on the disabled carrier/cell, the data need preferably be sent by the terminal UE on another carrier/cell; and the transferred data needs to be inserted into another carrier/cell for sending according to the data sequence of a radio link control protocol, and cannot directly be inserted at the tail.

In another aspect, if the cell deactivation conditions of a primary carrier frequency are satisfied, and when the cell is deactivated as a service cell in the primary carrier frequency, the Node B needs to notify the RNC that the cell cannot be deactivated immediately, and a decision of the RNC needs to be waited. The decision of the RNC includes the deactivation, that is, the terminal UE will not maintain any radio link; and a new cell that is added into the primary carrier frequency, in which a connection is set up between the terminal UE and the new cell for performing data transmission, and the newly added cell is a service cell. The subsidiary carrier frequency is replaced with the primary carrier frequency.

It should be further noted that as the carrier frequency only having data sending in the embodiment 2 does not have the corresponding UL physical channel and F-DPCH for performing inner-loop power control, the Node B cannot notify the RNC that the radio link corresponding to the carrier frequency is available or failed through monitoring the synchronization and loss of synchronization of the UL link as that in the prior art, so as to realize dismantlement of the radio link or link maintenance. Therefore, it is a preferred method that the activation of the single DL frequency point is reported through the measurement of the terminal UE (2d/2c event). That is, when 2c event is satisfied, the radio connection of the carrier frequency is continuously maintained, and when 2d event occurs, the connection is deleted.

In addition to the method of this embodiment, the control right of the deactivation of the carrier/cell can also be placed on the RNC. However, as the information of the RNC or the terminal UE passes through the Node B and the Iub interface therebetween, and the process introduces a long delay (200 ms). Furthermore, the Node B actually can directly obtain the signal quality and transmission quality of the radio link of each carrier/cell through the CQI report of the HS-DPCCH and the reception of the UL data. Therefore, it is feasible that the control right of deactivation of the carrier/cell is delegated to the Node B and the transmission time of the Iub interface is reduced, thus the control is more flexible, and can be realized by using a physical layer signaling or an MAC layer signaling.

In a method B, a physical layer signaling is used.

A High-Speed Shared Control Channel order (HS-SCCH order) is adapted to instruct to disable a certain DL or UL carrier/cell.

An E-DCH Absolute Grant Channel (E-AGCH) is adapted to carry a primary E-RNTI, and all the activation bits are set to be un-activated, so as to instruct to disable the UL carrier/cell.

As the two physical layer signalings do not have corresponding response mechanisms, in order to ensure the reliability, the Node B can continuously perform the sending for several times.

After the disable instruction is issued, the sending processing of the packets on the originally disabled carrier/cell of the Node B and the terminal UE are the same as that in the method A.

According to an embodiment of the present disclosure, a certain carrier frequency is flexibly activated and deactivated.

Embodiment 4

Figure 8:
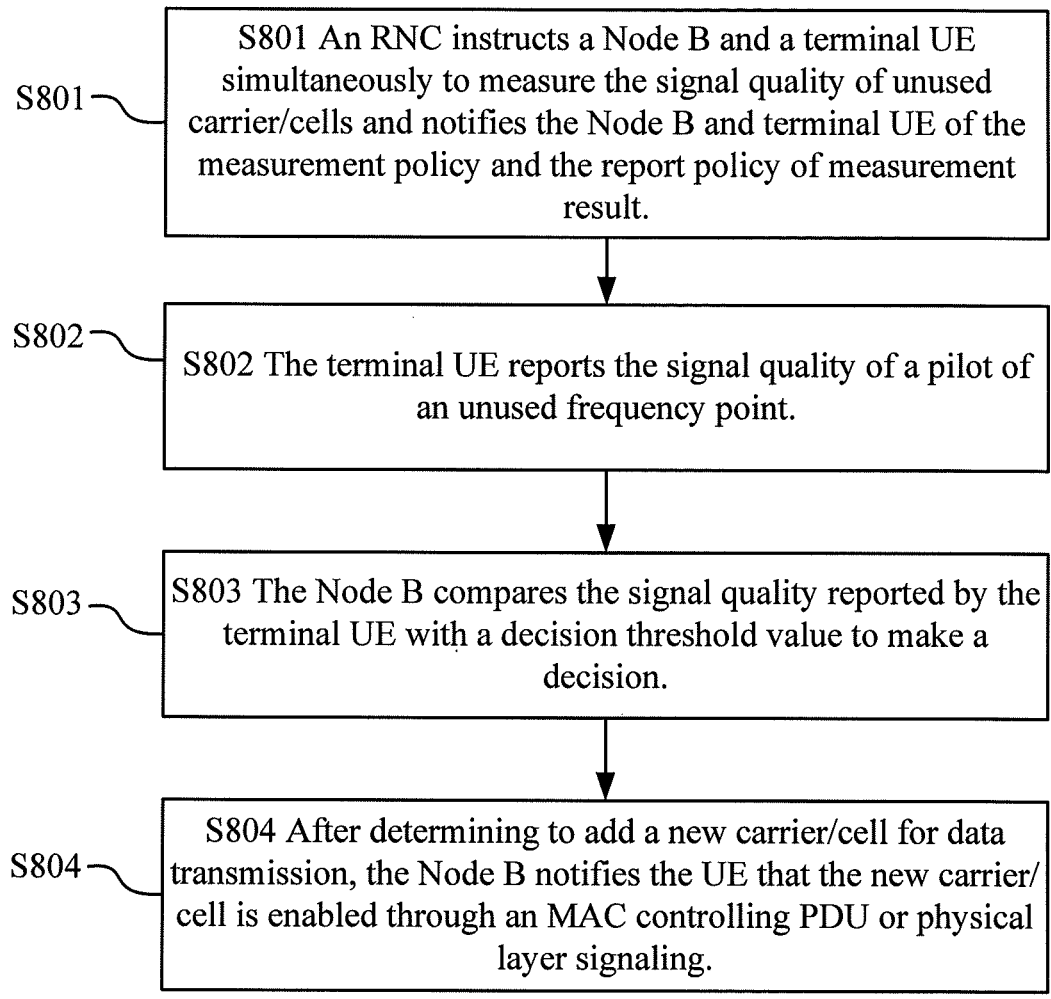
FIG. 8 is a schematic flow chart of activating a carrier frequency according to embodiment 4 of the present disclosure.

As shown in FIG. 8, in embodiment 4, a process of activating a carrier frequency is described in detail.

When a terminal UE transmits data in a multi-carrier/cell, the terminal UE continuously monitors the signal quality of an available carrier cell, and then reports the signal quality. When the terminal UE or a Node B finds out that the quality of a certain unused carrier/cell is improved enough to be adapted to transmit the data, the unused carrier/cell can be added into a transmission carrier/cell collection. When quality of a new carrier frequency is superior to that of the carrier frequency, the carrier frequency is replaced with the new carrier frequency, which is as shown by Steps S102 to S105 and Steps S110 to S113 in FIG. 1. The process includes the following steps.

In Step S801, an RNC instructs a Node B and a terminal UE to simultaneously measure the signal quality of unused carrier/cells and notifies the Node B and terminal UE of a measurement policy and a report policy of a measurement result. The RNC notifies the Node B of a quality threshold and a data amount threshold for enabling carrier/cell transmission.

In Step S802, the terminal UE reports the signal quality and the data amount of a pilot of an unused frequency point. The report method includes MAC controlling PDU, and a specific format is as shown in FIG. 4.

In Step S803, the Node B compares the signal quality reported by the terminal UE with a decision threshold value, and determines whether to add a new carrier/cell for data transmission. Alternatively, the Node B compares the signal data amount reported by the terminal UE with a decision threshold value, and determines whether to add a new carrier/cell for data transmission.

In Step S804, after determining to add a new carrier/cell for data transmission, the Node B notifies the terminal UE that the new carrier/cell is enabled through an MAC controlling PDU or physical layer signaling.

(1) The format of the MAC controlling PDU is as that described in the method A in the deactivation process in embodiment 3. Through the ACK received by a HARQ process, the new carrier/cell is considered to be activated, and the Node B can schedule and send the data on the new carrier/cell.

(2) Physical layer signaling: for enabling of a DL carrier/cell: when control channels of High-speed Downlink Packet Access (HSDPA) is sent on a carrier frequency collectively, as the format of the HS-SCCH can indicate the data transmission format of two carrier/cells, the format of data sent by the newly added carrier/cell is directly indicated in the format of HS-SCCH, so as to complete activating the new DL carrier/cell, and the indication method does not need an acknowledgement. The carrier frequency of the terminal UE is indicated by using the HS-SCCH order to monitor that another carrier frequency can also complete the activation of the new DL carrier frequency. After receiving the indication, the terminal UE monitors an HS-DPSCH transmission format of the activated carrier frequency on the HS-SCCH channel while receiving data on the original carrier frequency, so as to start to receive the data on the new carrier frequency. This method may have an acknowledgement, for example, a specific CQI value sent by the HS-DPCCH. For activation of a UL carrier/cell, activation is realized by using an HS-SCCH order , an E-AGCH, or an E-DCH Relatively Grant Channel (E-RGCH). The physical layer signaling may be a signaling borne on a physical layer information E-AGCH, or a signaling borne on the E-RGCH.

In another aspect, the UE may also determine whether to activate a certain UL carrier/cell. The UE obtains the signal quality through measurement of the DL carrier frequency, and knows the sending amount of byte. Under a premise that the RNC tells the UE the decision criteria, the UE makes a decision, and then requests the network to activate the unused carrier/cell. The network determines whether to accept the request of the UE according to the load of itself, the signal quality feedback, and the data amount of the UE. If the request is accepted, scheduling is started on the activated carrier frequency; and if the request is not accepted, a negative acknowledgement is returned on the original carrier frequency.

In another aspect, the terminal UE may also determines whether to activate or deactivate a certain UL carrier/cell. According to the traffic volume and the channel quality of the UL carrier frequency, and under the premise that the RNC tells the terminal UE the decision criteria, the terminal UE makes a decision, and then requests the network to activate or deactivate the UL carrier/cell. The requesting mode includes requesting through a UL physical layer signaling or a UL RNC signaling. The UTRAN network determines whether to accept the request of the terminal UE according to the load or the DL signal quality feedback. If accepting the request, the UTRAN network initiates an activation/deactivation command.

Figure 9:
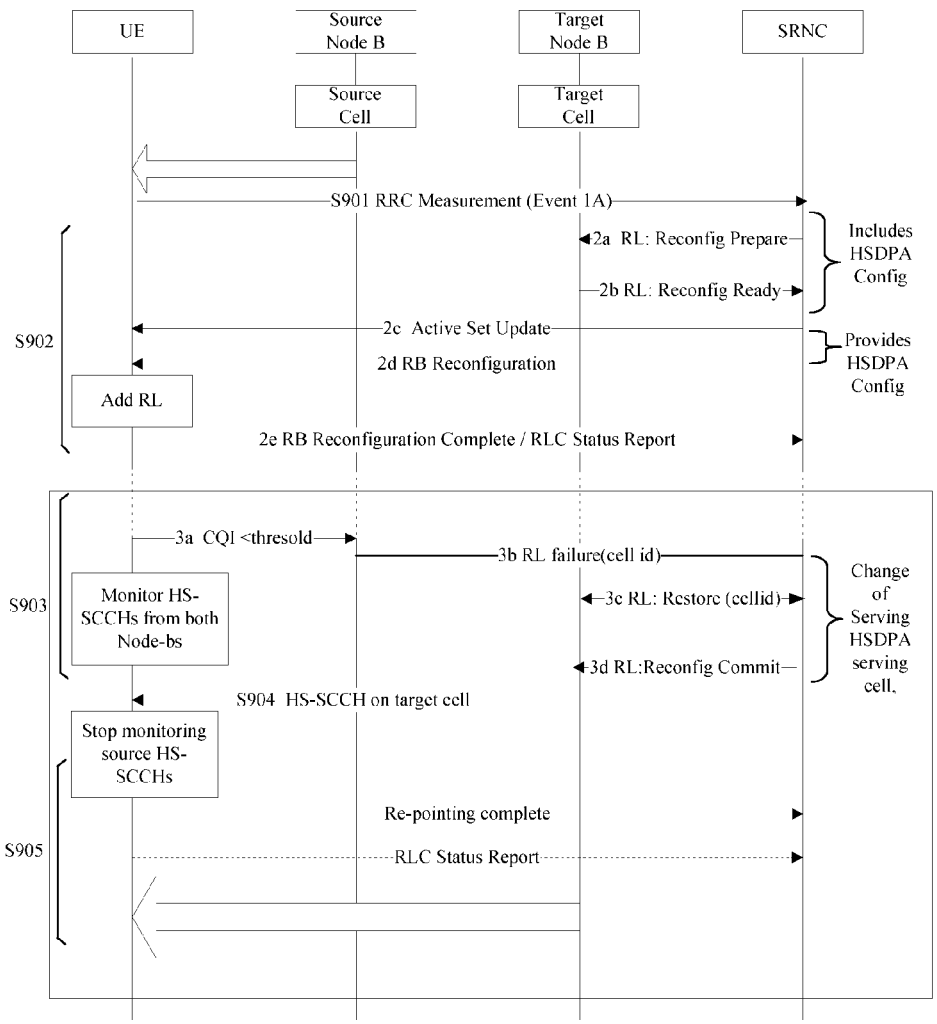
FIG. 9 is a schematic flow chart of link replacement according to embodiment 4 of the present disclosure.

It should be further noted that as for the deactivation/activation determination of the carrier frequency with a pair of physical channels in the embodiment 2, a 2d/2c (replacing the primary carrier frequency) (or a 1X event (not replacing the primary carrier frequency)) event or the radio link synchronization or loss of synchronization monitoring function of the NB can be adapted to realize the maintenance and deactivation of the carrier frequency/cell. However, the deactivation determination has a great influence on the data transceiving performed by the terminal UE by using the multicarrier, so before the current carrier frequency/cell is deactivated, a radio link with a pair of physical channels is usually set up in a new carrier frequency/cell. Here, the terminal UE may actually use at least three radio links, in which one is a physical channel (a non-carrier frequency) only with DL, the second one is the original radio link (a cell 1 of the primary carrier frequency) with a pair of physical channels, and the third one is the newly setup radio link (a cell 2 of the primary carrier frequency) with a pair of physical channels. When such a situation occurs, the data sent by the new and original radio links with the pair of physical channels is the same. If the frequency points of the two radio links are the same, the procedure as shown in FIG. 9 can be adapted to realize the procedure of replacing the original link with the new link rapidly. The process includes the following steps.

In Step S901, the terminal UE reports a measurement report to report a 1X event, the RNC determines to add a target cell in to an activation set of the primary carrier frequency, and notifies the terminal UE through an "update activation set", and at the same time, the RNC and the Node B implement the setup of the radio link of the new cell of the Node B by using a radio link reconfiguration procedure of Iub.

In Step S902, after receiving the update of the activation set, the terminal UE starts to monitor the pilot channel quality of the target cell while monitoring the original cell, and reports the CQI to the Node B.

In Step S903, after the Node B finds out that the CQI of the target cell CQI is superior to that of the original cell for a period of time, the Node B sends an HS-SCCH at the target cell to instruct the terminal UE to receive the data from the target cell.

In Step S904, after receiving the HS-SCCH from the target cell, the terminal UE starts to receive data at the target cell, and does not receive the data from the original cell.

In Step S905, the Node B receives an acknowledgement ACK of the data sent by the terminal UE, and it is determined that the terminal UE has been switched to the target cell, so the RNC is notified that the service cell of the HSDPA of the primary carrier frequency of the terminal UE is replaced. The notifying process may use an existing radio link recovery process on the Iub, and is realized by adding a cell ID into the signaling.

The function of the HS-SCCH of this embodiment can be realized by using the E-RGCH.

According to an embodiment of the present disclosure, a certain carrier frequency is flexibly activated and deactivated.

Embodiment 5

In embodiment 5, in view of the situation that some switching area scenes or both the two frequency points have larger signal fading, an operation method of a carrier frequency is set forth, which is described in the following.

Firstly, a terminal UE performs measurement at frequency points besides the used carrier frequencies and the cells besides the specified cells (cells out of the use set), and reports the measurement results to an RNC. In this embodiment, the measurement rule and the rules of measurement control and measurement report out of the use set are not changed.

The cells of the use set belong to the same Node B, the reporting the signal measurement of the cells of the use set to the RNC may be reduced or canceled, and if necessary, the Node B will notify the RNC.

In a switching area, the signal quality of all the frequency points in the use set is very poor and satisfies the deactivation conditions, the Node B needs to notify the RNC, such that the RNC determines whether to maintain one of the frequency points or delete all the frequency points.

Embodiment 6

Figure 10:
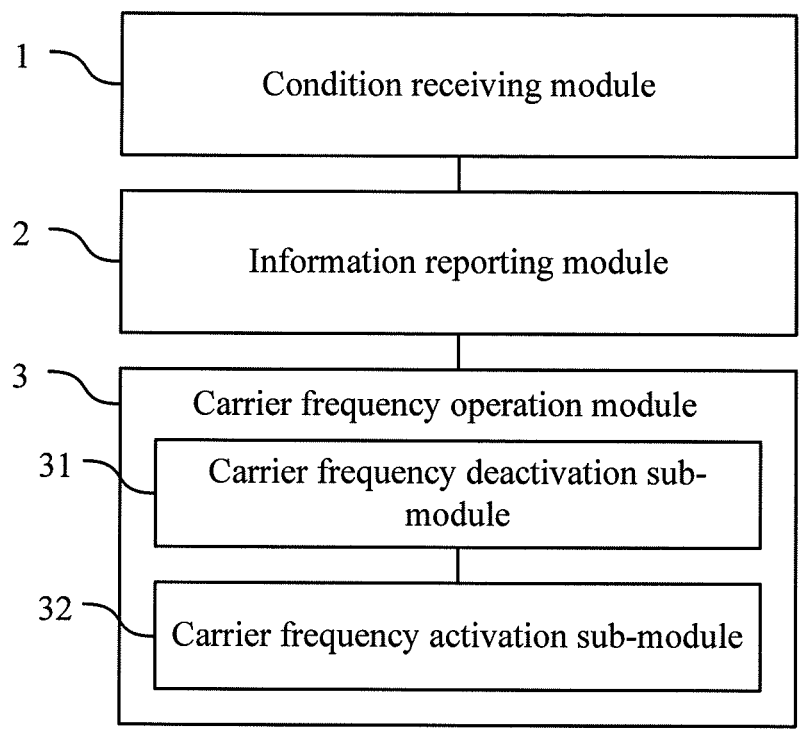
FIG. 10 is a schematic structural view of a terminal according to embodiment 6 of the present disclosure.

FIG. 10 is a schematic structural view of a terminal according to embodiment 6 of the present disclosure. As shown in FIG. 10, the terminal includes a condition receiving module 1, an information reporting module 2, and a carrier frequency operation module 3.

The condition receiving module 1 is adapted to receive carrier frequency reporting conditions.

The information reporting module 2 is adapted to report CQI information of a carrier frequency satisfying the carrier frequency reporting conditions received by the condition receiving module 1, so as to make a deactivation or activation determination.

The carrier frequency operation module 3 is adapted to deactivate or activate the carrier frequency according to a result of the deactivation or activation determination.

The carrier frequency operation module 3 includes a carrier frequency deactivation sub-module 31 and a carrier frequency activation sub-module 32.

The carrier frequency deactivation sub-module 31 is adapted to deactivate the carrier frequency according to the result of the deactivation determination.

The carrier frequency activation sub-module 32 is adapted to activate the carrier frequency according to the result of the activation determination.

Embodiment 7

Figure 11:
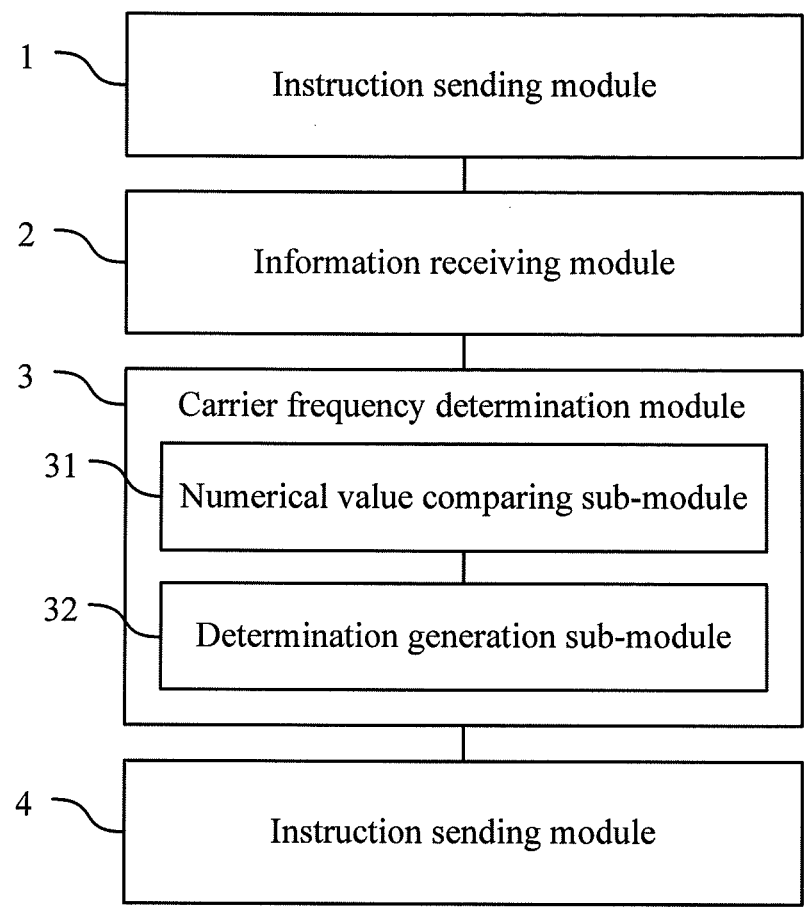
FIG. 11 is a schematic structural view of a network device according to embodiment 7 of the present disclosure.

FIG. 11 is a schematic structural view of a network device according to embodiment 7 of the present disclosure. As shown in FIG. 11, the network device includes an instruction sending module 1, an information receiving module 2, a carrier frequency determining module 3, and an instruction sending module 4.

The instruction sending module 1 is adapted to send carrier frequency reporting conditions to a terminal.

The information receiving module 2 is adapted to receive CQI information sent by the terminal.

The carrier frequency determining module 3 is adapted to compare the CQI information received by the information receiving module 2 with a deactivation threshold or an activation threshold, and determine to deactivate or activate the carrier frequency.

The instruction sending module 4 is adapted to send a result of the determination of the carrier frequency determining module 3 to the terminal.

The carrier frequency determining module 3 includes a numeric value comparing sub-module 31 and a determination generation sub-module 32.

The numeric value comparing sub-module 31 is adapted to compare the CQI information with the deactivation threshold or the activation threshold.

The determination generation sub-module 32 is adapted to generate a determination result to the carrier frequency according to a comparison result of the numeric value comparing sub-module.

An embodiment of the present disclosure, adopts the method of carrier frequency quality information reporting and threshold determination, such that when two carrier frequencies are used in DL, and a Node B serves as a control center, a certain carrier frequency is flexibly activated or deactivated.

Embodiment 8

Figure 12:
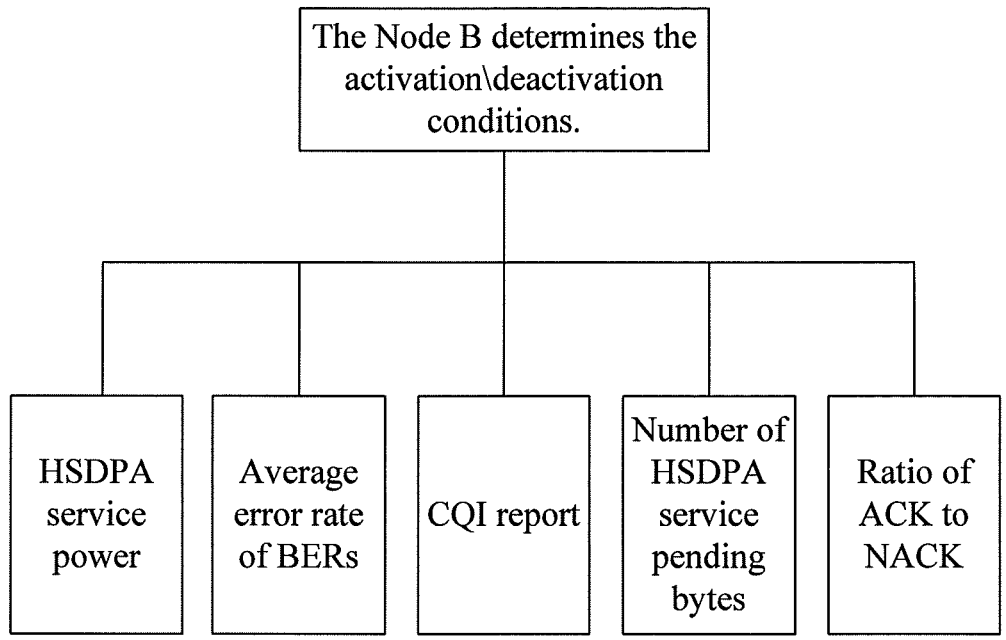
FIG. 12 is a schematic view of determination conditions for activation/deactivation of a Node B according to embodiment 8 of the present disclosure.

As shown in FIG. 12, a process of making a deactivation or activation decision by a Node B is described in detail in embodiment 8. In this embodiment, decision conditions include carrier frequency deactivation/activation conditions and carrier frequency reporting conditions, which are sent to the Node B through an RNC to notify the Node B. In this embodiment, cells A and B are multi-carrier cells for each other.

In this embodiment, it is determined whether to deactivate a carrier frequency according to a measurement performance or buffering performance of the carrier frequency or CQI information of the carrier frequency reported by a terminal UE. This embodiment includes the following sub-embodiments.

In one sub-embodiment (1), the Node B makes a determination based on the power load occupied by the HSDPA service of the carrier frequency. The carrier frequency decision occasion of the Node B may be triggered by an event or triggered periodically.

In Step 11, a multi-carrier/cell connection between the terminal UE and the network is set up.

In Step 12, the RNC sends the carrier frequency deactivation/activation conditions and carrier frequency reporting conditions to the Node B.

In Step 13, the Node B feeds back response information to the RNC.

In Step 14, the cells A and B are in a dual-carrier common working mode. In a period of time, if this embodiment is in a time inspection window, the Node B measures the HSDPA service power of the carrier frequency emitted by the cell, in which the HSDPA service power of the carrier frequency refers to the power generated by the HSDPA service bearing the carrier frequency. If the power load occupied by the HSDPA service of the carrier frequency of the cell B is higher than a preconfigured power threshold of power load, an order of deactivating the cell B is triggered to close the reception of the subsidiary carrier, so as to deactivate the cell B.

In Step 15, after the cell B is deactivated, the cell A is in a single carrier frequency working mode. In a period of time, if this embodiment is in a time inspection window, and the power load occupied by the HSDPA service of the carrier frequency of the cell B is always lower than the preconfigured power threshold of power load, an order of activating the cell B is triggered to open the reception of the subsidiary carrier, so as to activate the cell B.

In another sub-embodiment (2), the Node B measures a Bit Error Rate (BER) of the carrier frequency of the DPCCH received by the cell, and makes a determination based on the average error rate of the BERs of the carrier frequency. The carrier frequency decision occasion may be triggered by an event or triggered periodically.

In Step 21, a multi-carrier/cell connection between the terminal UE and the network is set up.

In Step 22, the RNC sends the carrier frequency deactivation/activation conditions and carrier frequency reporting conditions to the Node B.

In Step 23, the Node B feeds back response information to the RNC.

In Step 24, cells A and B are in a dual-carrier frequency common working mode. In a period of time, this embodiment is in a time inspection window, if the average error rate of BERs of the carrier frequency of the cell B is higher than a preconfigured threshold of average error rate at this state, an order of deactivating the cell B is triggered.

In Step 25, after the cell B is deactivated, the cell A is in a single carrier frequency working mode. According to a timer set by an upper layer, after the timer expires, an order of activating the cell B is triggered, so as to activate the cell B. After the cell B is deactivated, the Node B cannot measure the BER of the DPCCH of the cell B, so a timer is adapted to perform the periodic activation.

In another sub-embodiment (3), the Node B makes a determination based on the CQI report, and this method has been described in embodiment 1, and will not repeated herein.

In another sub-embodiment (4), the Node B side measures the number of HSDPA service pending bytes of the carrier frequency, and the HSDPA pending traffic volume of the carrier frequency is saved in a buffer BUFFER of the Node B. In the multi-carrier/cell, with respect to the primary carrier frequency, the carrier frequency in a subordinate position is a subsidiary carrier frequency, and is the cell B in this embodiment.

The Node B makes a decision based on the number of current HSDPA service pending bytes. The carrier frequency decision occasion may be triggered by an event or triggered periodically.

In Step 31, a multi-carrier/cell connection between the terminal UE and the network is set up.

In Step 32, the RNC sends the carrier frequency deactivation/activation conditions and carrier frequency reporting conditions to the Node B.

In Step 33, the Node B feeds back response information to the RNC.

In Step 34, cells A and B are in a dual-carrier frequency common working mode. In a period of time, this embodiment is in a time inspection window, if the number of HSDPA service pending bytes of the multi-carrier/cell of the current terminal UE of the cell B is lower than a preconfigured threshold, an order of deactivating the cell B is triggered to close the reception of the subsidiary carrier frequency, so as to deactivate the cell B. In the current multi-carrier/cell, the cell B is a subsidiary carrier frequency.

In Step 35, after the cell B is deactivated, the cell A is in a single carrier frequency working mode. In a period of time, this embodiment is in a time inspection window, the number of HSDPA service pending bytes of the multi-carrier/cell of the current terminal UE of the cell B is higher than a precon-figured threshold, an order of activating the cell B is triggered to open the reception of the subsidiary carrier frequency, so as to activate the cell B.

In another sub-embodiment (5), the Node B makes a determination based on the ratio of ACK to NACK of the carrier frequency of the cell. The carrier frequency decision occasion may be triggered by an event or triggered periodically.

After checking or receiving information, the terminal UE sends response information to the Node B. If the response information received by the Node B is ACK, it indicates that the check result or the received information is correct; and if the response information received by the Node B is NACK, it indicates that the check result or the received information is error.

In Step 51, a multi-carrier/cell connection between the terminal UE and the network is set up.

In Step 52, the RNC sends the carrier frequency deactivation/activation conditions and carrier frequency reporting conditions to the Node B.

In Step 53, the Node B feeds back response information to the RNC.

In Step 54, cells A and B are in a dual-carrier carrier frequency common working mode. In a period of time, this embodiment is in a time inspection window, if the ratio of ACK to NACK of the carrier frequency of the cell B is lower than a preconfigured threshold, an order of deactivating the cell B is triggered to close the reception of the subsidiary carrier frequency, so as to deactivate the cell B.

In Step 55, the cell A is in a single carrier frequency working mode, after a timer arranged at the Node B side expires, an order of activating the cell B is triggered to open the reception of the subsidiary carrier frequency, so as to activate the cell B. After the cell B is deactivated, the Node B cannot receive the ACK and NACK information of the carrier frequency of the cell B, so a timer is adapted to perform the periodic activation.

In this embodiment, the Node B determines to deactivate a carrier/cell, for example, after the carrier/cell B is disabled, if the carrier/cell B is a DL carrier/cell, the Node B transfers the data that is ready to be sent by the carrier/cell B back to the carrier/cell A for sending. As for packets that have been sent but having no HARQ response of the terminal UE received, the Node B waits for the HARQ acknowledgement of the terminal UE. If no response of the terminal UE is received when the response time expires or the response is NACK, the data will not be resent on the carrier/cell B, but is transferred to on the carrier/cell A for resending. The resent data should be resent on the carrier/cell A preferably. The packets transferred from the carrier/cell B to the carrier/cell A for resending should be sequenced and sent according to the sequence number of the RLC layer of the data, but not directly disposed at the tail of the data sequence in the carrier/cell A. FIG. 5 shows the data sending states of two carrier/cells when the carrier/cell B is disabled, and FIG. 7 is a schematic view of transferring the data in a corresponding queue of the carrier/cell B into the carrier/cell A for sending after the carrier/cell B is disabled. If the two carrier/cells share an MAC--hs/ehs queue, only the data needing to be resent is processed, and transference and insertion procedures of the queue are omitted.

After instructing the terminal to deactivate the subsidiary carrier frequency, in which the subsidiary carrier frequency is the cell B in this embodiment, a data operation procedure of deactivating the subsidiary carrier frequency by the terminal is performed, which is described in the following.

A response is waited, for the data sent by the subsidiary carrier frequency but having no response received.

The data sent by the subsidiary carrier frequency but having no response received or having a failed response received in a response time is resent by other carrier frequencies.

The data not sent by the subsidiary carrier frequency is transferred into a sending sequence of other carrier frequencies according to a sequence number of the data for being sent or discarded.

When quality of a new carrier frequency quality is superior to that of the carrier frequency, the carrier frequency is replaced with the new carrier frequency, or when the quality of the new subsidiary carrier frequency quality is superior to that of the subsidiary carrier frequency, the subsidiary carrier frequency is replaced with a new subsidiary carrier frequency.

According to an embodiment of the present disclosure, a certain carrier frequency is flexibly activated and deactivated through controlling of Node B.

Embodiment 9

Figure 13:
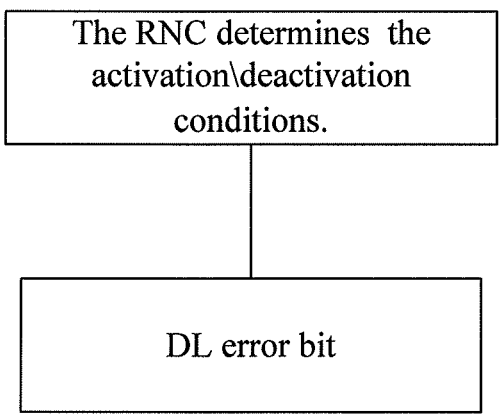
FIG. 13 is a schematic view of determination conditions for activation/deactivation of an RNC according to embodiment 9 of the present disclosure.

As shown in FIG. 13, the deactivating or activating the RNC is described in detail in embodiment 9. The RNC decision occasion may be triggered by an event or triggered periodically. The RNC determines whether to deactivate the cell B through determining the DL error rate of the carrier frequency of the cell.

In Step 1, a multi-carrier/cell connection between a terminal UE and a network is set up.

In Step 2, an RNC sends carrier frequency reporting conditions to the terminal UE through forwarding by a Node B.

In Step 3, the terminal UE feeds back response information to the RNC through forwarding by the Node B.

In Step 4, cells A and B are multi-carrier frequency cells for each other, and are in a dual-carrier frequency working mode. In a period of time, this embodiment is in a time inspection window, if the DL error rate of the carrier frequency of the cell B is higher than a preconfigured threshold of the DL error rate, the terminal UE reports the event to notify the RNC, and the RNC triggers an order of deactivating the cell B through the Node B to close the reception of a subsidiary carrier frequency, so as to deactivate the cell B. The terminal UE may also periodically report the error rate of the cell.

In Step 5, after the cell B is deactivated, the cell A is in a single carrier frequency working mode. According to a timer set by an upper layer, the RNC starts a timer, and after the timer expires, the RNC triggers an order of activating the cell B through the Node B. After the cell B is deactivated, the terminal UE cannot report the error rate of the cell B, so a timer is adapted to perform the periodic activation.

According to an embodiment of the present disclosure, a certain carrier frequency is flexibly activated and deactivated through controlling of RNC.

Embodiment 10

Figure 14:
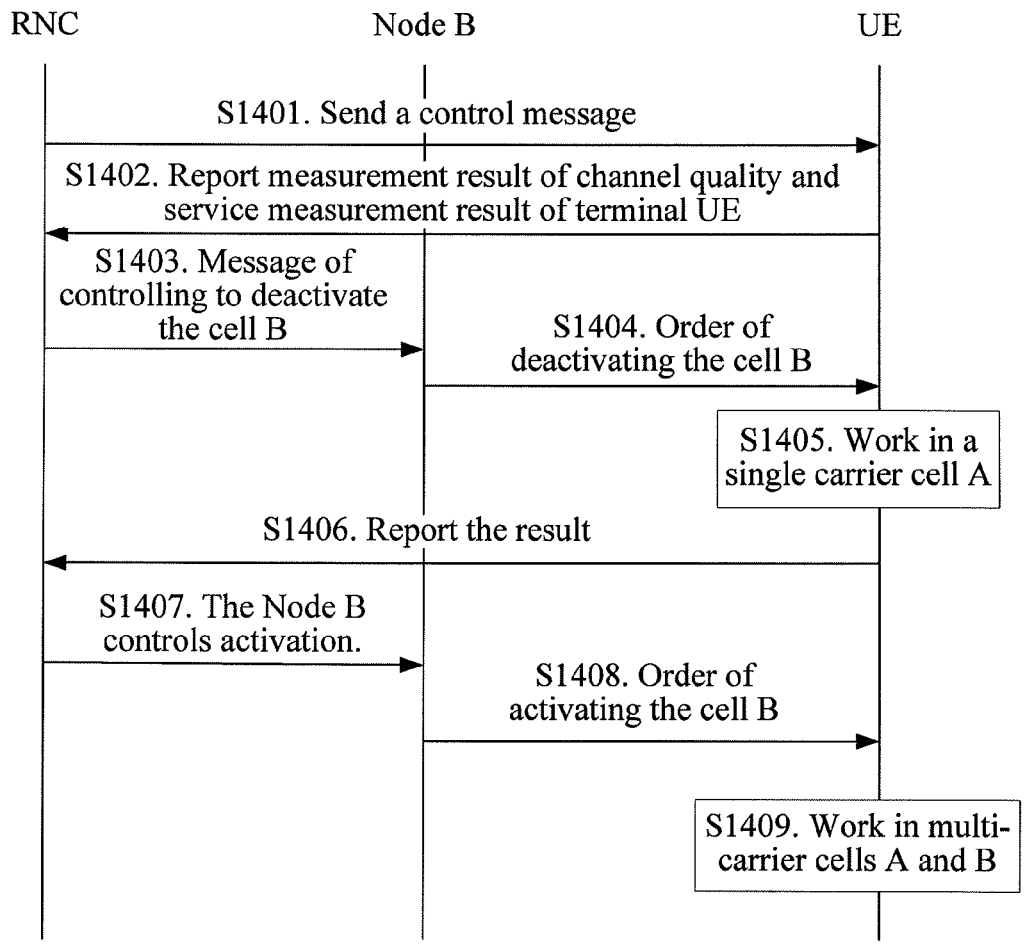
FIG. 14 is a schematic flow chart of a signaling of activation/deactivation of an RNC according to a embodiment 10 of the present disclosure.

FIG. 14 is a process of a signaling of activation/deactivation of a dual-carrier frequency cell after determination of an RNC.

In this embodiment, cells A and B are multi-carrier cells for each other.

In Step S1401, an RNC sends a control message to a terminal UE to trigger an activation/deactivation decision. The control message includes a channel quality threshold, a terminal UE service threshold, decision conditions, and a report cycle, and the terminal UE is controlled to report in a manner of event or in a periodic manner.

In Step S1402, the terminal UE reports the measurement result of the channel quality and the service measurement result of terminal UE, and the RNC makes an activation/deactivation determination.

In Step S1403, if the reported signal quality is lower than the threshold value, a determination result is deactivation, and the RNC sends a message of controlling to deactivate the cell B to the Node B. The message includes the following cells: a cell identifier, a terminal UE identifier, and an activation/deactivation action.

In Step S1404, the Node B forwards an order of deactivating the cell B to the terminal UE.

In Step S1405, the terminal UE works in a single carrier cell A.

In Step S1406, the terminal UE reports the result, and the RNC makes a determination.

In Step S1407, if the reported signal quality is higher than the threshold value, the decision is activation, and the RNC sends a message of controlling to activate the cell B. The message includes the following cells: a cell identifier, a terminal UE identifier, and an activation/deactivation action.

In Step S1408, the Node B forwards an order of activating the cell B to the terminal UE.

In Step S1409, the terminal UE works in multi-carrier cells A and B.

According to an embodiment of the present disclosure, a certain carrier frequency is flexibly activated and deactivated through controlling of Node B.

Eleventh Embodiment

Figure 15:
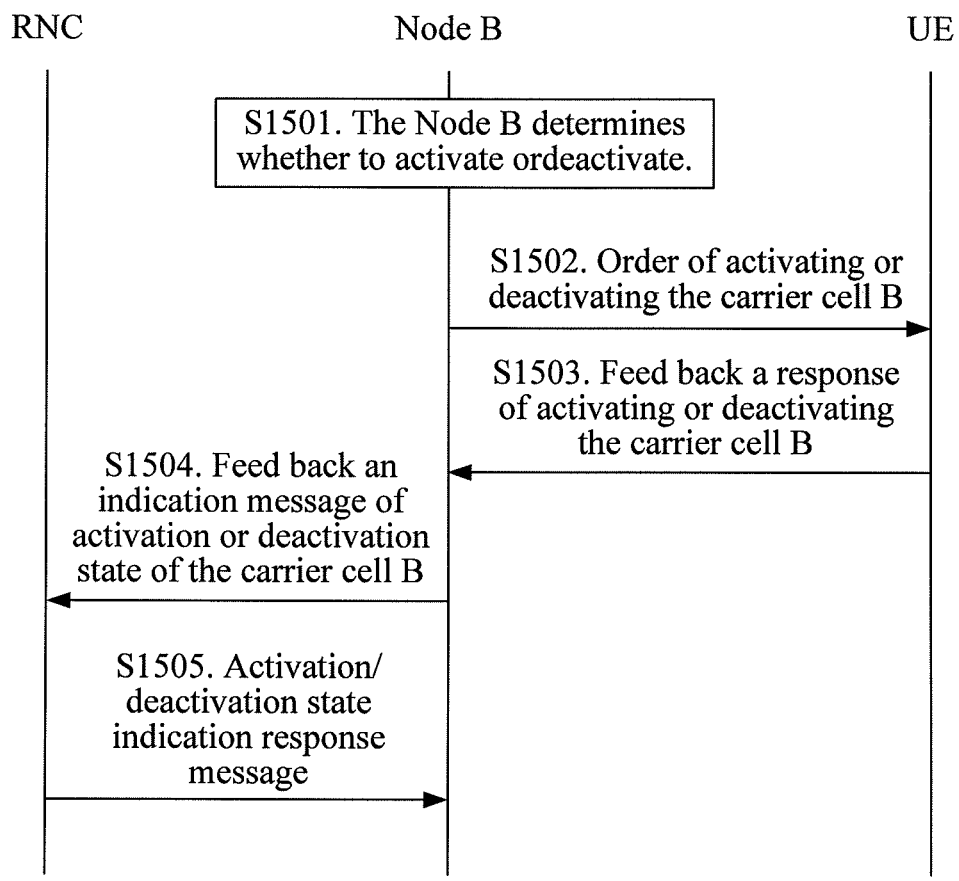
FIG. 15 is a schematic flow chart of a signaling indicating an activation/deactivation state to an RNC after an Node B performs an activation/deactivation according to an eleventh embodiment.

FIG. 15 is a process of signaling of reporting activation/deactivation state to an RNC after a Node B makes an activation/deactivation determination according to an embodiment of the present disclosure. Cells A and B are multi-carrier cells for each other.

In S1501, the Node B determines to perform an operation of activating or deactivating the carrier cell B on a terminal UE.

In S1502, the Node B sends an order of activating or deactivating the carrier cell B to the terminal UE.

In S1503, the terminal UE feeds back a success response of activating or deactivating the carrier cell B to the Node B.

In S1504, the Node B feeds back an indication message of activation or deactivation state of the carrier cell B to the RNC according to the success response of activating or deactivating the carrier cell B. The message needs to include an identifier of the activated/deactivated terminal UE. The identifier may be, but not limited to, identifier types being U-RNTI, H-RNTI, E-RNTI, CRNC CONTEXT, or Node B CONTEXT.

After receiving the message, the RNC sets the working mode variation of the terminal UE to be DUAL CELL dual-carrier frequency or SINGLE CELL single carrier frequency. If the state indication message is to activate the carrier cell B, the working mode of the terminal UE is turned to be DUAL CELL dual-carrier frequency, and the message of activating the carrier cell B is saved; if the state indication message is to deactivate the carrier cell B, the working mode of the terminal UE is turned to be SINGLE CELL single carrier frequency, and the information of the carrier cell B needs to be deleted.

The method of this embodiment further includes the following steps.

In S1505, the RNC sends an activation/deactivation state indication response message to the Node B.

According to an embodiment of the present disclosure, a certain carrier frequency is flexibly activated and deactivated through controlling of RNC.

Twelfth Embodiment

Figure 16:
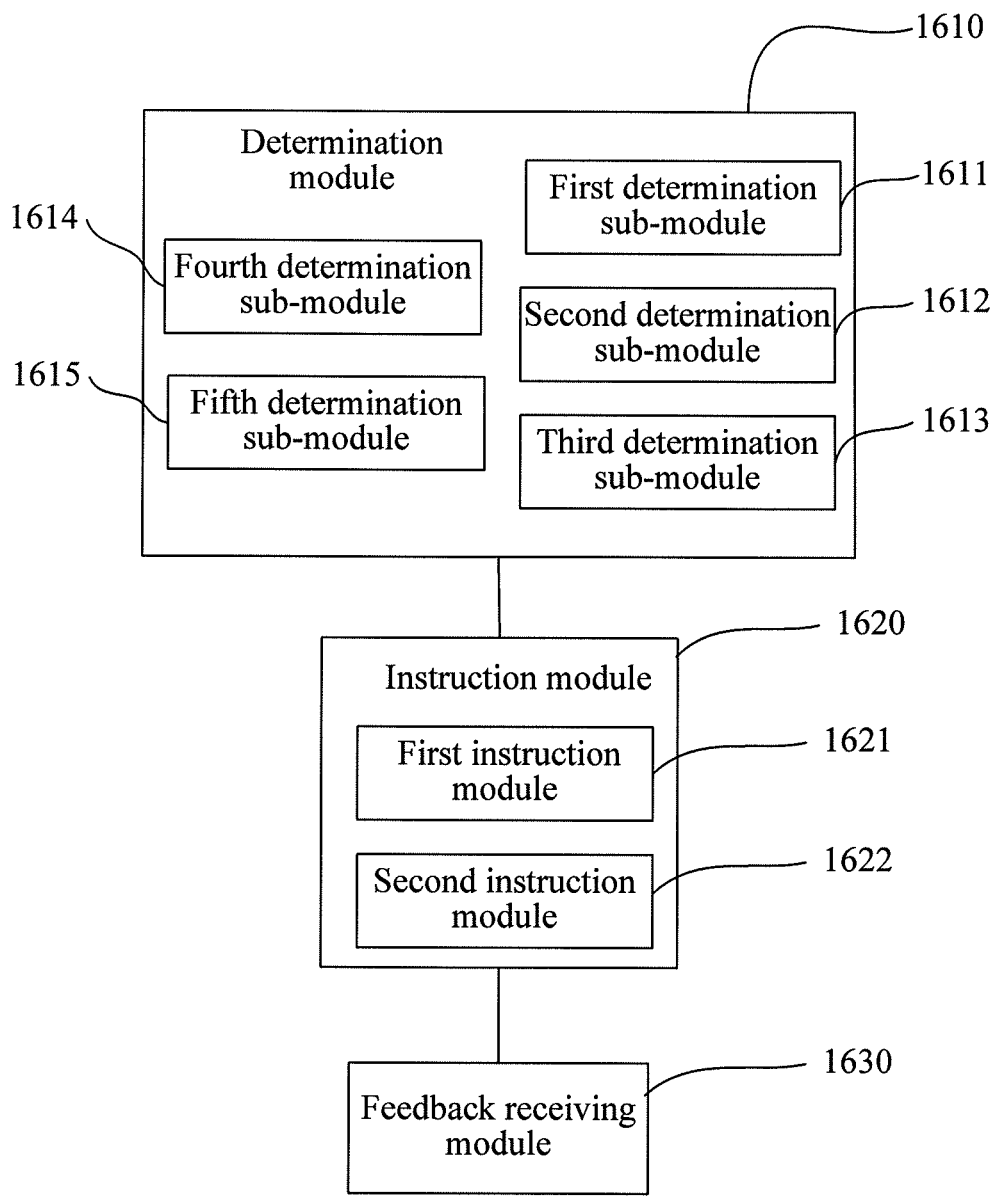
FIG. 16 is a schematic structural view of a network device according to a twelfth embodiment of the present disclosure.

FIG. 16 is a schematic structural view of a network device. As shown in FIG. 16, the network device includes a determination module 1610 and an instruction module 1620.

The determination module 1610 is adapted to perform a deactivation or activation determination on a carrier frequency according to measurement performance of the carrier frequency; or perform a deactivation or activation determination on a subsidiary carrier frequency according to a buffering performance of a multi-carrier/cell.

The instruction module 1620 is adapted to instruct a terminal to deactivate or activate a carrier frequency according to a determination result of the determination module 1610, when the determination module 1610 makes the determination according to the measurement performance of the carrier frequency, and instruct the terminal to deactivate or activate a subsidiary carrier frequency according to the determination result of the determination module 1610, when the determination module 1610 makes the determination according to the buffering performance of the multi-carrier/cell.

The network device further includes a feedback receiving module 1630, adapted to receive a feedback of deactivating the carrier frequency or activating the carrier frequency sent by the terminal.

The determination module 1610 further includes a first determination sub-module 1611, a second determination sub-module 1612, a third determination sub-module 1613, a fourth determination sub-module 1614, or a fifth determination sub-module 1615.

The first determination sub-module 1611 is adapted to compare a power load occupied by an HSDPA of the carrier frequency with a deactivation threshold or an activation threshold according to the measured power load occupied by the HSDPA of the carrier frequency, and perform a deactivation or activation determination on the carrier frequency.

The second determination sub-module 1612 is adapted to compare an average error rate of BERs of the carrier frequency with a deactivation threshold according to the measured average error rate of BERs of the carrier frequency, and make a deactivation determination to the carrier frequency; and activate the carrier frequency when a preset timer expires after deactivation.

The third determination sub-module 1613 is adapted to compare a number of HSDPA service pending bytes of the carrier frequency with a deactivation threshold or an activation threshold according to the measured number of HSDPA service pending bytes of the carrier frequency, and perform a deactivation or activation determination on a subsidiary carrier frequency, in which the carrier frequency is a subsidiary carrier frequency.

The fourth determination sub-module 1614 is adapted to compare a ratio of ACK to NACK of the carrier frequency with a deactivation threshold according to the ratio of ACK to NACK of the carrier frequency reported by a terminal, and make a deactivation determination to the carrier frequency; and activate the carrier frequency when a preset timer expires after deactivation.

The fifth determination sub-module 1615 is adapted to make a deactivation determination to the carrier frequency based on a DL error rate of the carrier frequency reported by a terminal; and activate the carrier frequency when a preset timer expires after deactivation.

The instruction module 1620 further includes a first instruction module 1621 or a second instruction module 1622.

The first instruction module 1621 is adapted to carry the determination result through an MAC layer PDU, so as to instruct the terminal to deactivate or activate the carrier frequency.

The second instruction module 1622 is adapted to carry the determination result through a physical layer signaling, so as to instruct the terminal to deactivate or activate the carrier frequency.

In the network device adopted by the embodiments of the present disclosure, a certain carrier frequency is flexibly activated and deactivated.

Through the descriptions of the preceding embodiments, those skilled in the art may understand that the present disclosure may be implemented by using hardware only or by using software and a necessary universal hardware platform. Based on such understandings, the embodiments of the present disclosure may be embodied in the form of a software product. The software product may be stored in a nonvolatile storage medium, which can be a Compact Disk Read-Only Memory (CD-ROM), Universal Serial Bus (USB) flash drive, or a removable hard drive. The software product includes a number of instructions that enable a computer device (personal computer, server, or network device) to execute the methods provided in the embodiments of the present disclosure.

The above descriptions are merely preferred embodiments of the present disclosure, but not intended to limit the scope of the present disclosure. Any modification, equivalent replacement, or improvement made without departing from the spirit and principle of the present disclosure should fall within the scope of the present disclosure.

What is claimed is:

1. A method for controlling activation/deactivation of a carrier frequency by a Node B instead of a Radio Network Controller (RNC) in a multi-carrier/cell High Speed Packet Access (HSPA) system, the method comprising:
   determining, by the Node B, whether to activate or deactivate a subsidiary carrier frequency of the multi-carrier/cell HSPA system according to a parameter associated with the subsidiary carrier frequency;
   transmitting, by the Node B, when determining to activate or deactivate the subsidiary carrier frequency, a High-Speed Shared Control Channel (HS-SCCH) order to a terminal to instruct the terminal to activate or deactivate the subsidiary carrier frequency; and
   receiving, by the Node B, a feedback message responsive to the HS-SCCH order from the terminal.

2. The method according to claim 1, wherein the feedback message responsive to the HS-SCCH order is an acknowledgment (ACK) message.

3. The method according to claim 1, wherein the parameter comprises an average bit error rate (BER).

4. The method according to claim 1, wherein the parameter comprises a service power.

5. The method according to claim 1, wherein the parameter comprises channel quality information (CQI).

6. The method according to claim 1, wherein the parameter comprises a buffering status.

7. The method of claim 1, wherein the parameter for the Node B determining comprises at least one of downlink traffic or channel condition.

8. A Node B configured to be applied in a multi-carrier/cell High Speed Packet Access (HSPA) system and operable to control activation/deactivation of a carrier frequency in the multi-carrier/cell HSPA system, the Node B comprising:
   a controller configured to determine whether to activate or deactivate a subsidiary carrier frequency of the multi-carrier/cell HSPA system according to a parameter associated with the subsidiary carrier frequency;
   a transmitter configured to transmit, upon a determination to activate or deactivate the subsidiary carrier frequency, a High-Speed Shared Control Channel (HS-SCCH) order to a terminal to instruct the terminal to activate or deactivate the subsidiary carrier frequency; and a receiver configured to receive a feedback message responsive to the HS-SCCH order from the terminal.

9. The Node B according to claim 8, wherein the feedback message responsive to the HS-SCCH order is an acknowledgement (ACK) message.

10. The Node B according to claim 8, wherein the parameter comprises an average bit error rate (BER).

11. The Node B according to claim 8, wherein the parameter comprises a service power.

12. The Node B according to claim 8, wherein the parameter comprises channel quality information (CQI).

13. The Node B according to claim 8, wherein the parameter comprises a buffering status.

14. The Node B of claim 8, wherein the parameter for the Node B determining whether to activate or deactivate comprises at least one of downlink traffic or channel condition.

15. A multi-carrier/cell High Speed Packet Access (HSPA) system comprising:
a radio network controller (RNC); and
a Node B configured to communicatively couple with the RNC and to control activation or deactivation of a subsidiary carrier frequency of the multi-carrier/cell HSPA system, wherein the Node B is configured to:
determine whether to activate or deactivate the subsidiary carrier frequency according to a parameter associated with the subsidiary carrier frequency;
transmit, when the Node B determines to activate or deactivate the subsidiary carrier frequency, a High-Speed Shared Control Channel (HS-SCCH) order to a terminal to instruct the terminal to activate or deactivate the subsidiary carrier frequency; and
receive a feedback message responsive to the HS-SCCH order from the terminal.

16. The multi-carrier/cell HSPA system according to claim 15, wherein the feedback message in response to the HS-SCCH order is an acknowledgement (ACK) message.

17. The multi-carrier/cell HSPA system according to claim 15, wherein the parameter comprises an average bit error rate (BER).

18. The multi-carrier/cell HSPA system according to claim 15, wherein the parameter comprises a service power of the subsidiary carrier frequency.

19. The multi-carrier/cell HSPA system according to claim 15, wherein the parameter comprises channel quality information (CQI).

20. The multi-carrier/cell HSPA system according to claim 15, wherein the parameter comprises a buffering status.

21. The multi-carrier/cell HSPA system of claim 15, wherein the parameter for the Node B determining whether to activate or deactivate the subsidiary carrier frequency comprises at least one of downlink traffic or channel condition.

* * * * *